(12) United States Patent
Shitara et al.

(10) Patent No.: US 10,664,441 B2
(45) Date of Patent: May 26, 2020

(54) INFORMATION PROCESSING SYSTEM, INFORMATION PROCESSING APPARATUS, AND NON-TRANSITORY COMPUTER-READABLE RECORDING MEDIUM

(71) Applicant: FUJITSU LIMITED, Kawasaki-shi, Kanagawa (JP)

(72) Inventors: Yoshiharu Shitara, Numazu (JP); Yuji Nomura, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 15/624,029

(22) Filed: Jun. 15, 2017

(65) Prior Publication Data
US 2018/0018340 A1 Jan. 18, 2018

(30) Foreign Application Priority Data

Jul. 15, 2016 (JP) .................. 2016-140482

(51) Int. Cl.
*G06F 16/11* (2019.01)
*G06F 16/182* (2019.01)
*G06F 3/06* (2006.01)

(52) U.S. Cl.
CPC .......... *G06F 16/119* (2019.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

2001/0011324 A1 8/2001 Sakaki et al.
2003/0097454 A1 5/2003 Yamakawa et al.
(Continued)

FOREIGN PATENT DOCUMENTS

JP 10-171605 A 6/1998
JP 2003-203029 A 7/2003
(Continued)

OTHER PUBLICATIONS

Japanese Office Action dated Feb. 25, 2020 for corresponding Japanese Patent Application No. 2016-140482, with English Translation, 10 pages.

*Primary Examiner* — Denise Tran
(74) *Attorney, Agent, or Firm* — Fujitsu Patent Center

(57) ABSTRACT

An information processing apparatus, including: a memory unit; and a processor configured to perform a migration process of migrating a migration source file system to a migration target file system, the memory unit is configured to store first and second information, the first information managing a target object of the first migration process stored in the migration source file system and the target object to be stored in the migration target file system, and the second information managing a progress status of the first migration process for each object, the processor is configured to: select either or both of the migration source and target file systems based on the first and second information when a write request for the target object is received from a host apparatus; and perform a process related to the write request on the file system selected.

17 Claims, 32 Drawing Sheets

(52) U.S. Cl.
CPC .......... *G06F 3/0617* (2013.01); *G06F 3/0619* (2013.01); *G06F 3/0647* (2013.01); *G06F 16/183* (2019.01)

(56) References Cited

U.S. PATENT DOCUMENTS

| | | | |
|---|---|---|---|
| 2010/0274825 A1* | 10/2010 | Nemoto | G06F 3/0605 707/812 |
| 2010/0287257 A1 | 11/2010 | Shiozawa et al. | |
| 2013/0124674 A1* | 5/2013 | Matsumoto | G06F 3/0611 709/217 |
| 2015/0268867 A1 | 9/2015 | Oe et al. | |

FOREIGN PATENT DOCUMENTS

| | | |
|---|---|---|
| JP | 2006-524873 A | 11/2006 |
| JP | 2010-262488 | 11/2010 |
| JP | 2014-10540 | 1/2014 |
| JP | 2015-179425 | 10/2015 |
| WO | 2004097572 A2 | 11/2004 |
| WO | 2015-068208 | 5/2015 |

\* cited by examiner

FIG. 8

SELECTION EXAMPLE OF ACCESS DESTINATION NAS
(FILE SYSTEM) OF NFS REQUEST ACCORDING TO MIGRATION STATE

| NFS REQUEST | MIGRATION PROCESS | MIGRATION STATE | EXTENT | NFS ACCESS SOURCE FILE | NFS ACCESS SOURCE FILE | REMARKS |
|---|---|---|---|---|---|---|
| REFERENCE-RELATED | BEFORE EXECUTION | — | — | ✓ | × | |
| | DURING EXECUTION | — | — | ✓ | × | |
| | AFTER EXECUTION | — | — | × | ✓ | |
| UPDATED-RELATED | BEFORE EXECUTION | — | — | ✓ | × | |
| | DURING EXECUTION | INITIAL COPY | — | ✓ | × | |
| | | FULL COPY | OVERLAPPED | ✓ | × | SET DIRTY BIT IN TARGET EXTENT |
| | | | NON-OVERLAPPED | ✓ | ✓ | |
| | | DIFFERENTIAL COPY | OVERLAPPED | ✓ | × | SET DIRTY BIT IN TARGET EXTENT |
| | | | NON-OVERLAPPED | ✓ | ✓ | |
| | AFTER EXECUTION | — | — | × | ✓ | |

✓: ACCESS
×: NOT ACCESS

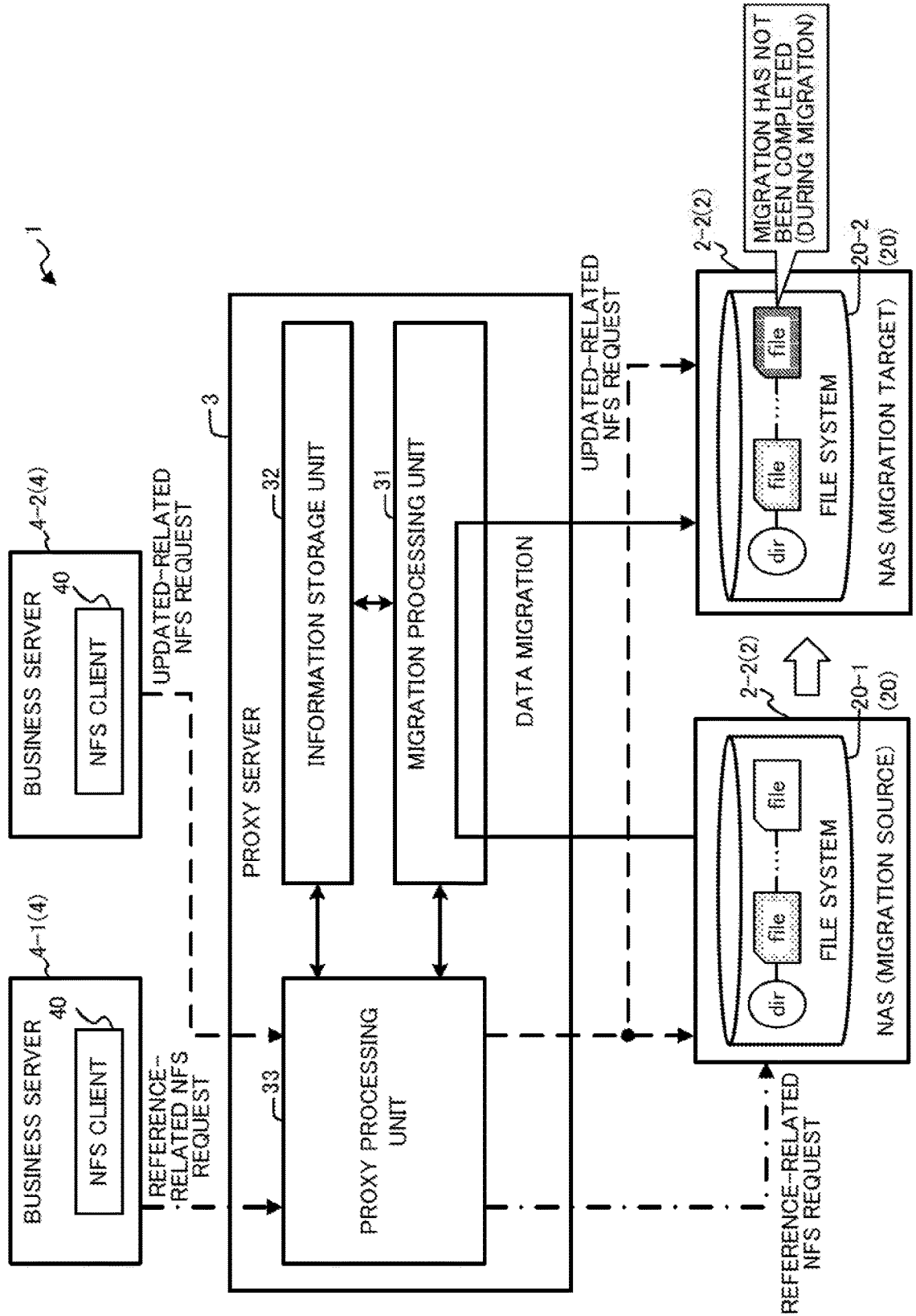

FIG. 13

EXAMPLE OF OBJECT DATA

| INFORMATION | FORMAT (SIZE) | DESCRIPTION |
|---|---|---|
| TYPE | INTEGER (32 BITS) | FOLLOWING VALUE IS SET IN ACCORDANCE WITH TYPE OF OBJECT<br>0:NORMAL FILE<br>2:CHARACTER FILE<br>3:BLOCK FILE<br>4:SYMBOLIC LINK<br>5:SOCKET<br>6:FIFO<br>7:DIRECTORY |
| NAME | TEXT (4096 BYTES) | STORE OBJECT NAME |

FIG. 14

EXAMPLE OF ATTRIBUTE INFORMATION

| MANAGEMENT INFORMATION | FORMAT (SIZE) | DESCRIPTION |
|---|---|---|
| mode | UNSIGNED INTEGER (32 BITS) | STORE OBJECT ACCESS AUTHORITY (READ, WRITE, AND EXECUTE AUTHORITIES) |
| owner | UNSIGNED INTEGER (32 BITS) | STORE IDENTIFICATION NUMBER ALLOCATED TO OWNER OF OBJECT |
| group | UNSIGNED INTEGER (32 BITS) | STORE IDENTIFICATION NUMBER ALLOCATED TO GROUP TO WHICH OWNER OF OBJECT BELONGS |
| atime | UNSIGNED INTEGER (64 BITS) | LAST OBJECT ACCESS TIME (UTC FORMAT) |
| mtime | UNSIGNED INTEGER (64 BITS) | LAST OBJECT UPDATE TIME (UTC FORMAT) |
| ctime | UNSIGNED INTEGER (64 BITS) | LAST OBJECT STATE CHANGE TIME (UTC FORMAT) |

FIG. 19

EXAMPLE OF LOGGING INFORMATION ~316

| Export_ID | FILE HANDLE | MIGRATION FLAG | MATCHING FLAG |
|---|---|---|---|
| 1 | aaaaaaaaaa | COMPLETED | NORMAL |
| 2 | bbbbbbbbbb | COMPLETED | ABNORMAL |
| 1 | cccccccccc | PROCESSING | |
| 1 | dddddddddd | NON-PROCESSED | ABNORMAL |

INFORMATION PROCESSING SYSTEM, INFORMATION PROCESSING APPARATUS, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-140482, filed on Jul. 15, 2016, the entire contents of which are incorporated herein by reference.

FIELD

The present invention relates to an information processing system, an information processing apparatus, and a non-transitory computer-readable recording medium having a control program recorded therein.

BACKGROUND

Network storages that provide a file system to a host apparatus such as a business server are known. As the network storage, for example, there is a storage apparatus such as a network attached storage (NAS) that implements a file system such as a network file system (NFS) and provides it to a host apparatus.

In the network storage, there are cases in which data migration between file systems, for example, online migration (hereinafter, also referred to simply as "migration") is performed. In the online migration, data of a migration source file system which is in operation is moved (transferred) to a migration target file system without stopping a user business.

Hereinafter, the migration source file system and the migration target file system are also referred to as a "source" and a "target," respectively. Further, a source network storage and a target network storage are also referred to as a "source storage" and a "target storage," respectively.

Patent Document 1: Japanese Laid-open Patent Publication No. 2015-179425
Patent Document 2: Japanese Laid-open Patent Publication No. 2010-262488
Patent Document 3: Japanese Laid-open Patent Publication No. 2014-10540
Patent Document 4: International Publication Pamphlet No. 2015/068208

In the network storage, there are cases in which availability and reliability of the system are decreased during execution of the migration.

For example, in the migration, when an access request such as an NFS request is issued to a storage area in which data is not moved yet, the target storage may process the NFS request after acquiring data from the source. At this time, there are cases in which, when it takes time to acquire data from the source, a business server determines it to be an input/output (I/O) timeout error with respect to the issued NFS request, and a business is unable to be continued.

In addition, there are cases in which the NFS request for files that have undergone the data movement (transfer) is executed in the target storage rather than the source storage. In the migration, since movement completed files are deleted from source and exist only in the target, when a storage failure occurs in the target during the migration, business data which is being operated may be lost.

SUMMARY

According to an aspect of embodiments, an information processing system, including: one or more network storages; and a relay apparatus that relays communication between a host apparatus and the one or more network storages, wherein the relay apparatus includes a memory unit; and a processor connected to the memory unit, wherein the processor is configured to perform a first migration process of migrating a migration source file system to a migration target file system among file systems included in the one or more network storages, the memory unit is configured to store object management information and migration management information, the object management information managing a target object of the first migration process stored in the migration source file system and the target object to be stored in the migration target file system, and the migration management information managing a progress status of the first migration process for each object, the processor is configured to: select either or both of the migration source file system and the migration target file system based on the object management information and the migration management information when a write request for the target object is received from the host apparatus; and perform a process related to the write request on the file system selected.

The object and advantages of the invention will be realized and attained by means of the elements and combinations especially pointed out in the claims.

It is to be reason that both detailed explanation and the following detailed explanation are omitted and explanatory and are not restrictive of the invention, as claimed.

BRIEF DESCRIPTION OF DRAWINGS

FIG. 8 is a diagram illustrating a selection example of an access destination of an NFS request;
FIG. 9 is a diagram illustrating an example of an NFS access destination during execution of migration;
FIG. 13 is a diagram illustrating an example of object data;

FIG. 14 is a diagram illustrating an example of attribute information;

FIG. 19 is a diagram illustrating an example of logging information;

DESCRIPTION OF EMBODIMENTS

Hereinafter, exemplary embodiments of the present invention will be described below with reference to the appended drawings. However, embodiments described below are merely examples and are not intended to exclude the application of various modifications or techniques which are not explicitly stated below. For example, the present embodiment is able to be implemented with various modifications without departing from the spirit thereof.

Figure 1:
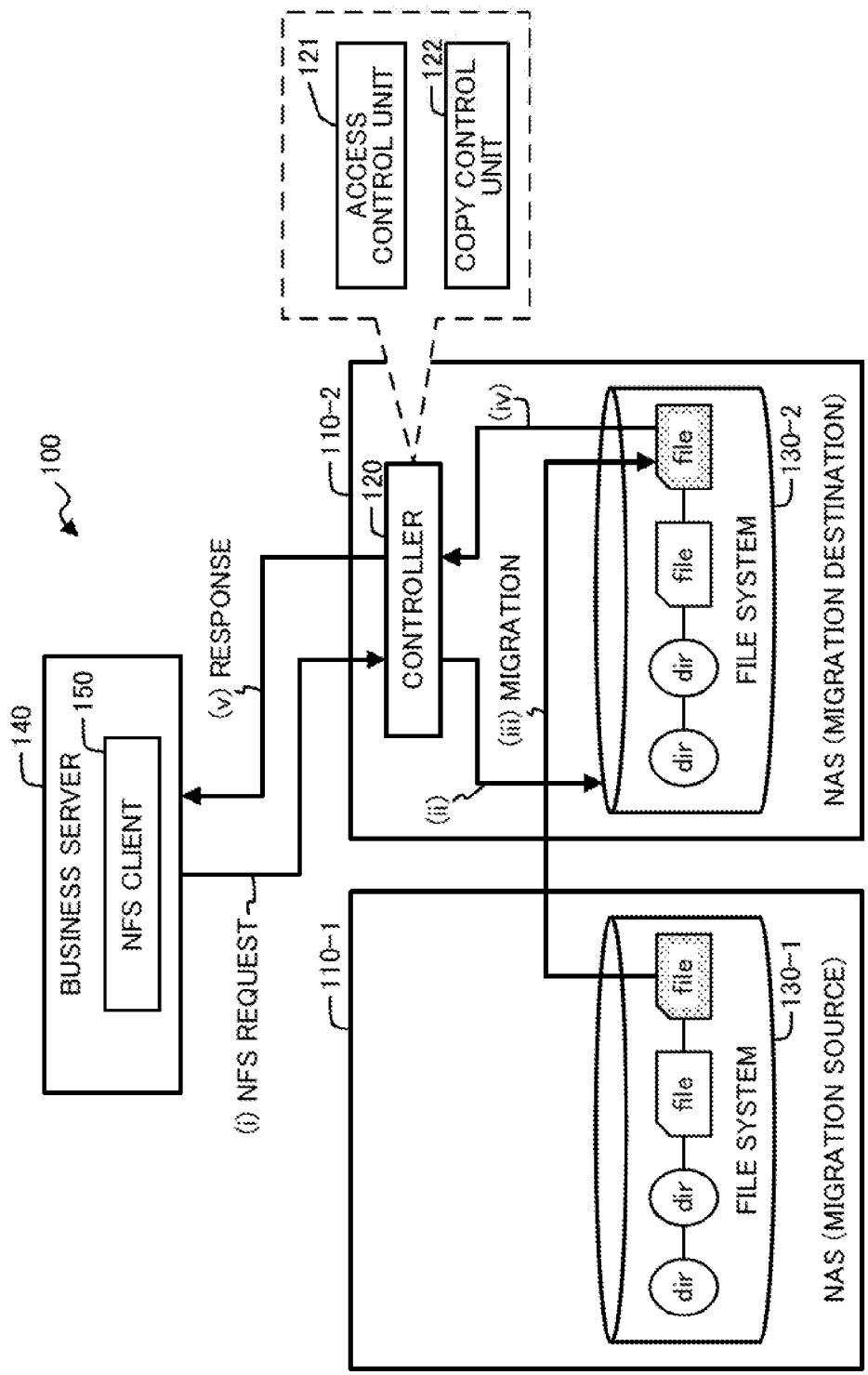
FIG. 1 is a block diagram illustrating an exemplary configuration of an information processing system.

In the drawings used in the following description, parts denoted by the same reference numerals indicate the same or similar parts unless otherwise stated. In addition, in the following description, when a plurality of apparatuses are not distinguished from one another, they may be indicated by omitting a number after a hyphen "-" of a reference numeral. As an example, when NAS 110-1 and NAS 110-2 illustrated in FIG. 1 are not distinguished from each other, they may be referred to simply as an "NAS 110."

[1] One Embodiment

First, migration using a function provided by a storage apparatus will be described. FIG. 1 is a block diagram illustrating an exemplary configuration of an information processing system 100.

In the following description, a migration source file system 130-1 and a migration target file system 130-2 are also referred to as a "source 130-1" and a "target 130-2," respectively. Further, NAS 110-1 and NAS 110-2 in which the source 130-1 and the target 130-2 are mounted, respectively, are also referred to as a "source storage 110-1" and a "target storage 110-2," respectively.

In the information processing system 100, the target storage 110-2 includes a controller 120 having a migration function.

Upon receiving an NFS request (initial access) from a business server 140 (arrow (i) in FIG. 1) for a file whose data has not been moved, the controller 120 moves target data from the source 130-1 to the target 130-2 (arrows (ii) and (iii)). Then, the controller 120 executes the NFS request on the file moved to the target 130-2 (arrows (iv) and (v)).

When the file is moved to the target 130-2, the target 130-2 executes next and subsequent NFS request for the file.

The NFS request is an I/O request using an NFS protocol, and the NFS protocol is an example of a communication protocol for accessing a file or a directory existing in the file system 130 via the network.

The NFS request may include a reference-related NFS request and an updated-related NFS request. The reference-related NFS request is a request for acquiring data such as a directory or a file from the file system 130. The updated-related NFS request is a request for creating, updating, deleting, or the like data such as a directory or a file in the file system 130.

Figure 2:
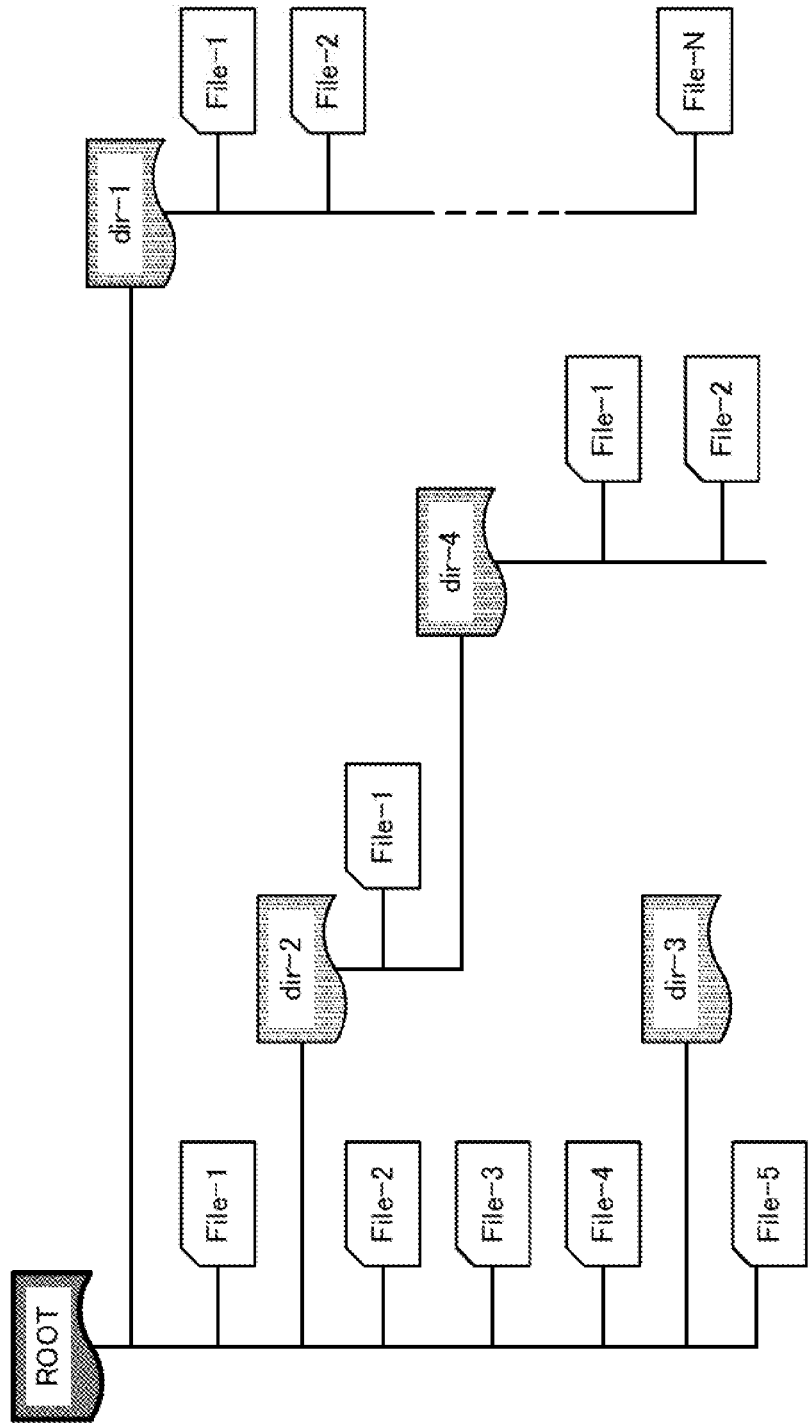
FIG. 2 is a diagram illustrating an example of a file system.

Next, the file system 130 will be described. As illustrated in FIG. 2, the file system 130 may have a directory hierarchy including files (denoted as "File-x"; x is a natural number) and a sub directory (denoted as "dir-y"; y is a natural number). A directory serving as a base point of the files may be referred to as a "root." A file or a directory may be given a unique name using a series of names constituting a path from the root. Further, a file or a directory may be also referred to as an "object."

In the migration, the controller 120 may move a file or a directory of the source 130-1 to the target 130-2 together with metadata and attribute information. The "metadata" is an example of information for managing, for example, a hierarchy of directories and files of the file system 130, and the "attribute information" is an example of information for managing access authorities of directories or files and attributes of owners.

Figure 3:
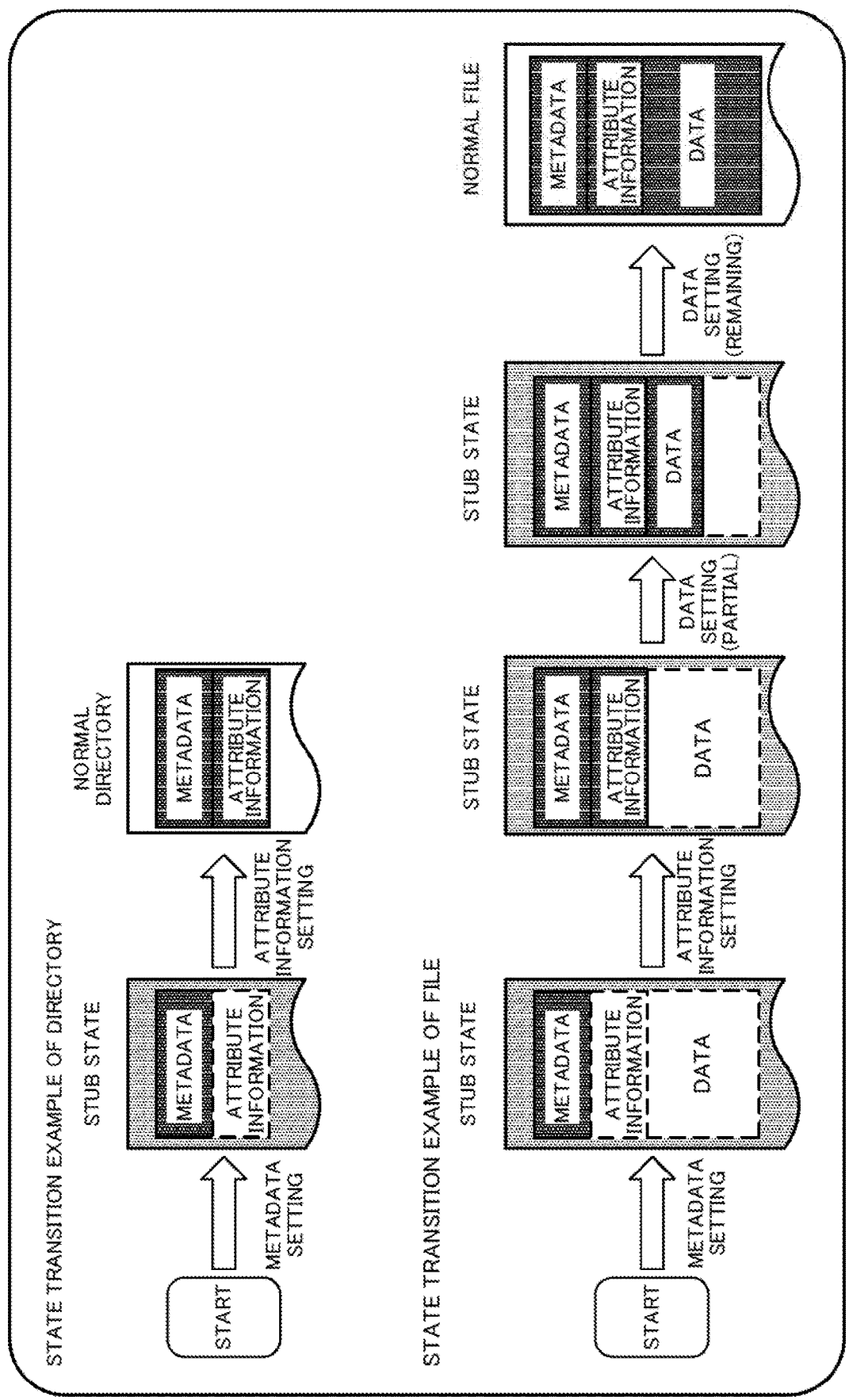
FIG. 3 is a diagram for describing an example of a migration procedure of a file system.

FIG. 3 is a diagram for describing an example of a migration procedure of the file system 130. In the case of directory migration, the controller 120 acquires the metadata (information of the directory hierarchy) from the source 130-1, and creates a stub in accordance with the metadata for the target 130-2. The "stub" is an example of a control file used for migration control.

Then, the controller 120 acquires the attribute information from the source 130-1 and reflects it in the stub file of the target 130-2. Once all pieces of information are reflected in the stub, this directory is released from a stub state and enters a normal directory state.

In the case of file migration, the controller 120 sequentially acquires the metadata and the attribute information from the source 130-1, similarly to the case of the directory, and creates a stub. Further, the controller 120 acquires data from the source 130-1 and reflects it in the stub file of the target 130-2. Once all pieces of information are reflected in the stub, this file is released from the stub state and enters a normal file state.

An NFS access to a directory or a file in the stub state is executed on the target 130-2 after data is acquired from the source 130-1 and reflected in a stub file, that is, after completion of copying. On the other hand, an NFS access to a normal directory or a normal file is executed on the target 130-2.

Next, an exemplary operation of the information processing system 100 will be described with reference to FIG. 4. The following exemplary operation is under the assumption that an NFS client 150 of a business server 140 performs the NFS access on the file system 130 which is to undergo the migration.

Figure 4:
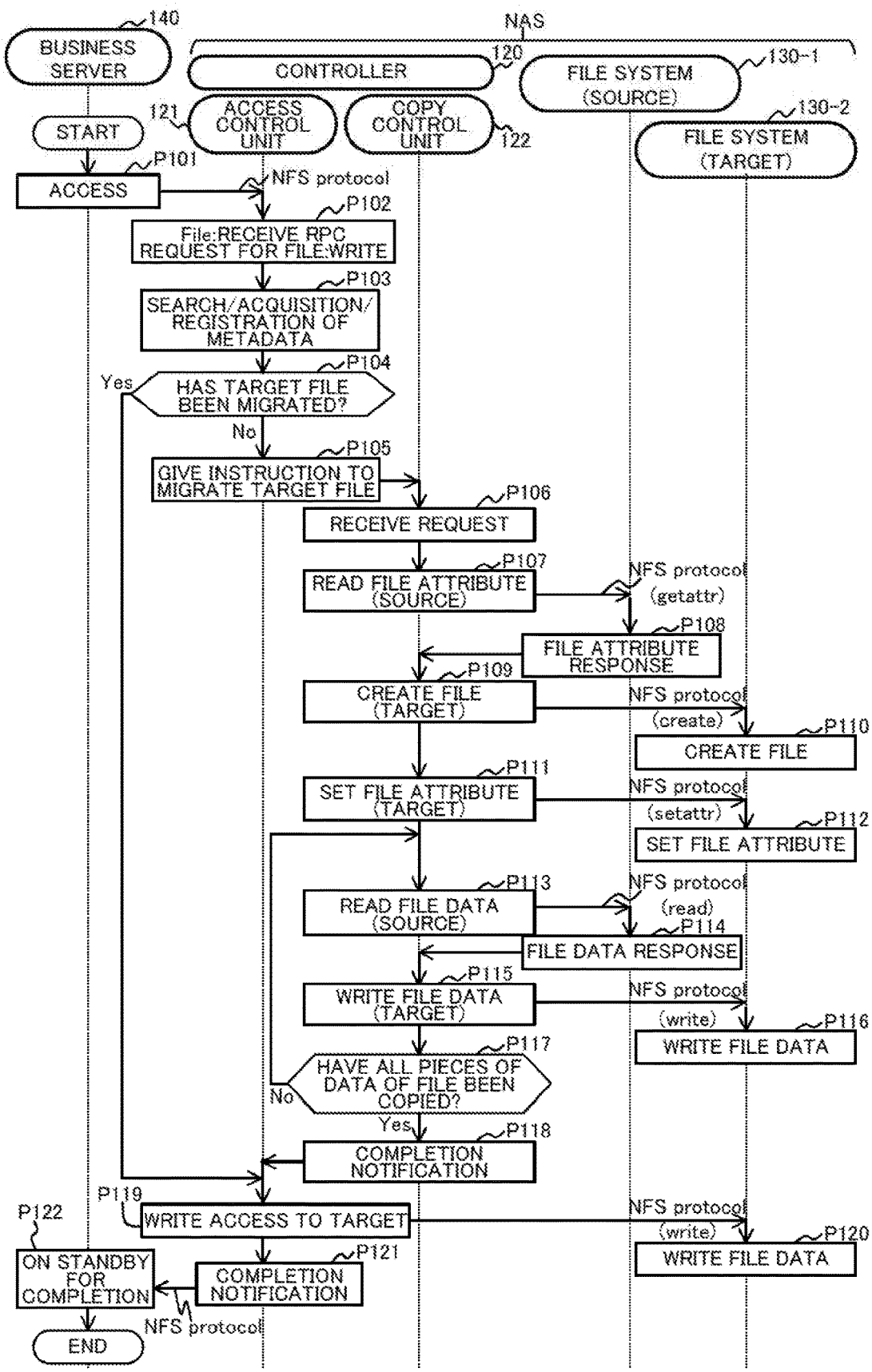
FIG. 4 is a flowchart for describing an exemplary operation of an information processing system.

In FIG. 4, for the sake of convenience, two file systems 130 are illustrated as being included in one NAS 110.

When the NFS client 150 of the business server 140 transmits an access request according to the NFS protocol (process P101), the controller 120 of the NAS 110 receives a "File: Write RPC" request (process P102). Process P102 may be performed by an access control unit 121 of the controller 120. The "RPC" is an abbreviation for remote procedure call and serves as a request for executing a procedure call between systems.

In response to the request, the access control unit 121 performs a search, acquisition, or registration of management information such as metadata (process P103), and determines whether or not an access target file has been migrated (process P104). When the access target file has been migrated (Yes in process P104), the process proceeds to P119.

On the other hand, when the access target file has not been migrated (No in process P104), the access control unit 121 instructs a copy control unit 122 of the controller 120 to migrate the target file (process P105).

Upon receiving a request from the access control unit 121 (process P106), the copy control unit 122 instructs the source 130-1 to read a file attribute through a getattr operation of the NFS protocol (process P107). The source 130-1 reads the file attribute and transmits it as a response (process P108).

The copy control unit 122 instructs the target 130-2 to create a file through a create operation of the NFS protocol (process P109), and the target 130-2 creates a file (process P110).

The copy control unit 122 instructs the target 130-2 to set the file attribute in the created file through a setattr operation of the NFS protocol based on the file attribute obtained from the source 130-1 (process P111). The target 130-2 sets the file attribute in the file (process P112).

Then, the copy control unit 122 instructs the source 130-1 to read file data through a read operation of the NFS protocol (process P113), and the source 130-1 reads the file data and transmits it as a response (process P114).

The copy control unit 122 instructs the target 130-2 to write the file data read from the source 130-1 through a write operation of the NFS protocol (process P115), and the target 130-2 writes the file data (process P116).

The copy control unit 122 determines whether or not all pieces of data of the file have been copied (process P117), and when there is data that has not been copied (No in process P117), the process proceeds to P113. On the other hand, if all pieces of data of the file has been copied (Yes in process P117), the copy control unit 122 gives a completion notification to the access control unit 121 (process P118).

The access control unit 121 instructs the target 130-2 to perform a write access to the target file received in the process P102 through a write operation of the NFS protocol (step P119), and the target 130-2 performs the write access to the target file (process P120).

The access control unit 121 gives a completion notification to the business server 140 through the NFS protocol (process P121), the NFS client 150 receives the notification in a completion standby state (process P122), and then the process ends. The file is in the stub state until Yes is determined in process P117 after the file is created in target 130-2 in process P110.

As illustrated in FIGS. 1 and 4, in the information processing system 100 using the migration function provided by the NAS 110, availability or reliability of the system may decrease during execution of migration as follows.

For example, when the target file has not been migrated (No in process P104), the NFS request for the target file is on standby until execution of process P105 to P118, and the NFS client 150 may determine it as an I/O timeout error. Since the business server 140 is unable to access the target file until the file copy is completed, a huge file such as a system image is unable to be migrated while continuing a business in term of an operation.

Further, since the NFS request for the file whose data movement is completed is executed by the target 130-2, when a storage failure occurs in the target 130-2 during the migration, business data which is being operated may be lost.

Furthermore, when the function provided by the NAS 110 is used, a choice of the NAS 110 is limited, and there are cases in which the NAS 110 that is optimum for business requirements of the user such as a function, performance, a cost, a provision vendor, and the like are unable to be selected. Moreover, vendor lock-in of the user system is accelerated.

For example, when the NAS 110 has a function in which migration to its own NAS 110 is assumed, but when migration to another NAS 110 is unable to be performed, selection of the NAS 110 of the migration target is limited to the NAS 110 supported by the migration source.

A migration method using an inter-housing data copy function of the source storage 110-1 and the target storage 110-2 may be employed as a migration technique as well. However, since the inter-housing data copy function is implemented using a block storage function, the data stored in the NAS 110 is copied without cooperating with the file system 130. For this reason, in order to continue the operation in the target 130-2 after the data of the source 130-1 and the target 130-2 become the equivalent state, a business which is being operated is stopped. Further, a task such as changing of an Internet protocol (IP) address of the NAS 110 is performed.

Furthermore, since the inter-housing data copy function is often implemented through a vendor's own technology, the target storage 110-2 is limited to the same model as the source storage 110-1. Further, since the inter-housing data copy function depends on a firmware version of the NAS 110, the firmware version of the source storage 110-1 may be demanded to be upgraded in advance.

Further, a worker may carry out the migration task using an operating system (OS) standard copy function of the business server 140 or the controller 120 instead of the migration function provided by the NAS 110. However, in this case, the worker may have a lot of burdens such as securing of workers, preparation of an environment, temporary business shutdown for migration, and the cost related to the migration may increase.

In this regard, in one embodiment, an information processing system capable of performing an NAS storage renewal (metabolism) while continuing a business as follows will be described.

[1-1] Information Processing System According to One Embodiment

Figure 5:
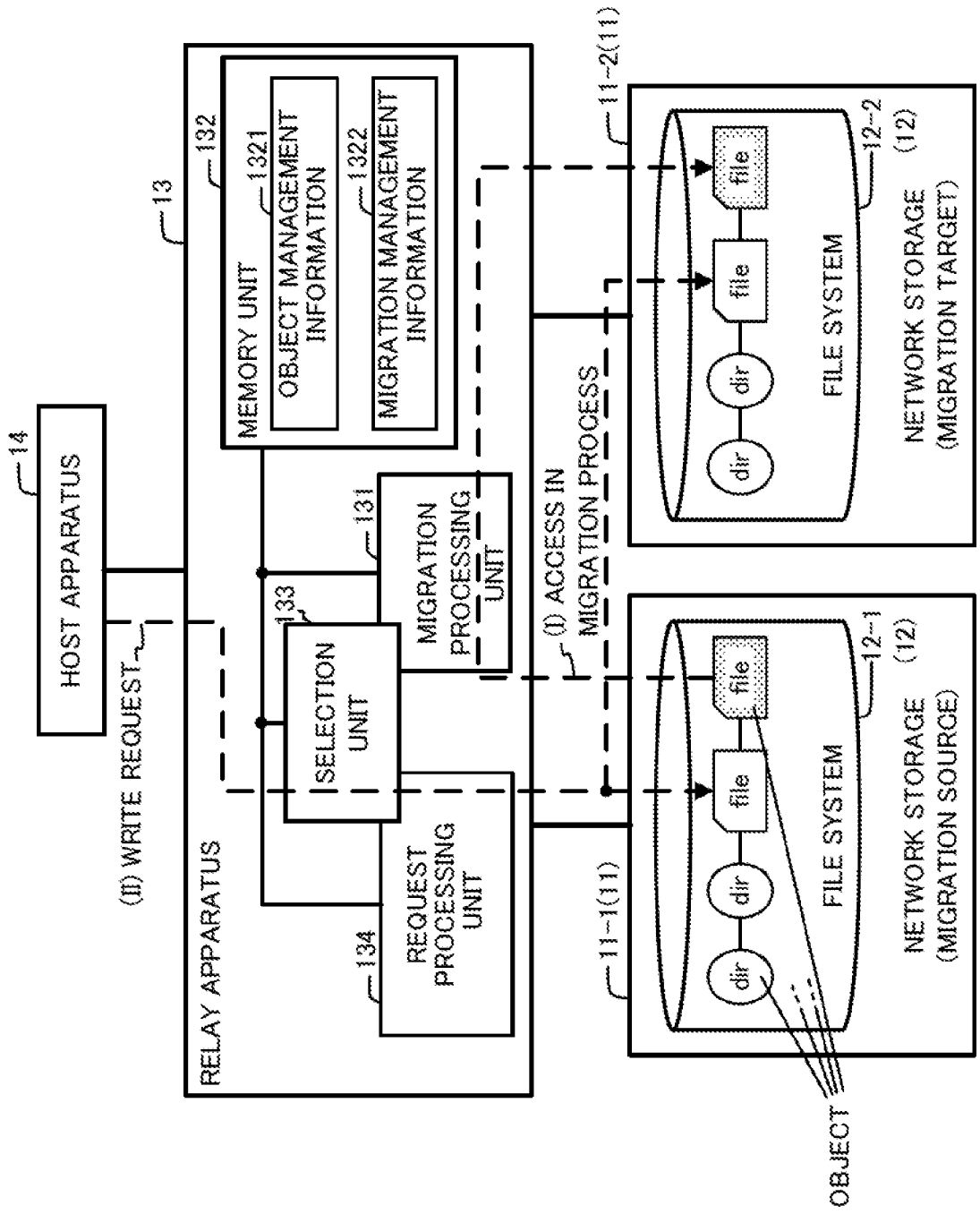
FIG. 5 is a block diagram illustrating an exemplary configuration of an information processing system according to one embodiment.

Next, one embodiment will be briefly described. FIG. 5 is a diagram illustrating an exemplary configuration of an information processing system according to one embodiment. As illustrated in FIG. 5, the information processing system may include one or more network storages 11-1 and 11-2 (two network storages in FIG. 5), a relay apparatus 13, and a host apparatus 14 as an example.

The network storages 11-1 and 11-2 may have file systems 12-1 and 12-2, respectively. The file system 12 may include objects such as files or directories. As the network storage 11, for example, there is an NAS.

The relay apparatus 13 may relay communication between the host apparatus 14 and the one or more network storages 11. As illustrated in FIG. 5, the relay apparatus 13 may include a migration processing unit 131, a memory unit 132, a selection unit 133, and a request processing unit 134.

The migration processing unit 131 may perform a first migration process of migrating the migration source file system 12-1 to the migration target file system 12-2 for the file system 12 included in the one or more network storages 11. For example, in the first migration process, all objects of the file system 12-1 may be moved or copied to the file system 12-2 for each object (see an arrow (I) in FIG. 5).

The memory unit 132 may include object management information 1321 and migration management information 1322. The object management information 1321 is information for managing a target object of the first migration process stored in the migration source file system 12-1 and the target object to be stored in the migration target file system 12-2. The migration management information 1322 is information for managing a progress status of the first migration process for each object.

When the write request for the target object is received from the host apparatus 14, the selection unit 133 may select either or both of the migration source file system 12-1 and the migration target file system 12-2 based on the object management information 1321 and the migration management information 1322.

The request processing unit 134 may execute a process related to the write request (see an arrow (II)) on the file system 12 selected by the selection unit 133.

The selection unit 133 may be implementing by causing the function of the migration processing unit 131 and the function of the request processing unit 134 to cooperate with each other.

As described above, the file system 12 in which the process relating to the write request is executed is selected based on the progress status of the first migration process, for example, information indicating a non-migrated state, a migrating state, a migrated state, or the like of the target object.

Therefore, it is possible to select both the migration source file system 12 so as not to be on standby until the execution of the write request or to select both the migration source file system 12-1 and the migration target file system 12-2 in order to secure redundancy of data. Accordingly, it is possible to improve the availability or reliability of the network storage 11 to be higher than in the information processing system 100 illustrated in FIG. 1. Further, it is possible to maintain (keep) the availability or reliability of the network storage 11 during the migration of file system 12 to be the same as before the migration.

[1-2] Exemplary Configuration of Information Processing System

Figure 6:
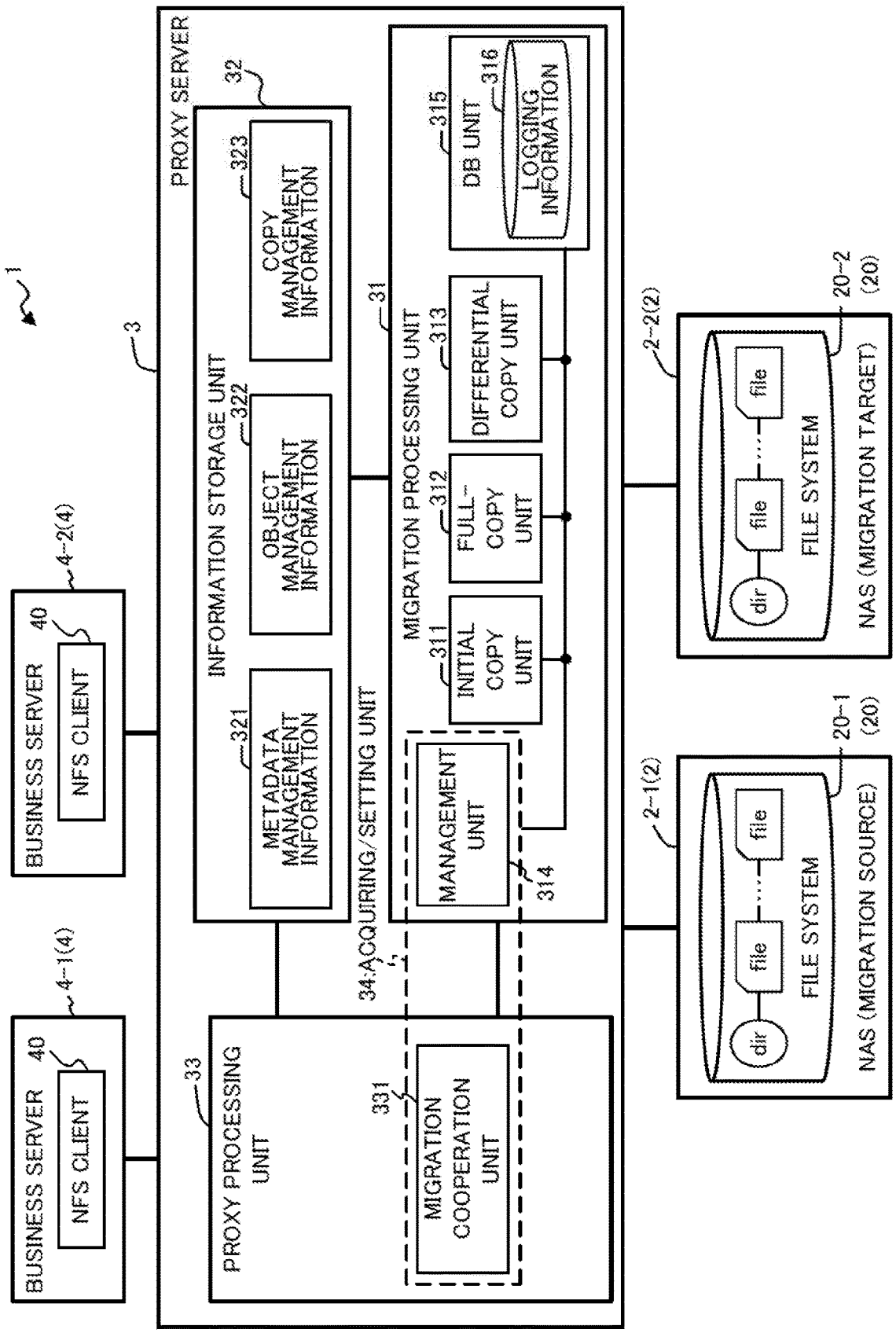
FIG. 6 is a block diagram illustrating an exemplary configuration of an information processing system according to one embodiment.

Next, an information processing system according to one embodiment will be described with reference to FIG. 6. FIG. 6 is a block diagram illustrating an exemplary configuration of an information processing system 1 according to one embodiment. As illustrated in FIG. 6, the information processing system 1 includes one or more NASs 2-1 and 2-2 (two NASs in FIG. 6), a proxy server 3, and one or more business servers 4-1 and 4-2 (two business servers in FIG. 6) as an example.

Only one NAS 2 may be provided in the information processing system 1, or three or more NASs 2 may be provided. Further, only one business server 4 may be provided in information processing system 1, or three or more business servers 4 may be provided.

In an example of FIG. 6, the proxy server 3 and the business server 4 may be connected via a local area network (LAN) cable or a network (not illustrated). The network may include an intranet such as a LAN or wide area network (WAN), the Internet, or the like. Further, the NAS 2 and the proxy server 3 may be SCSI-connected via, for example, a Fibre Channel (FC) cable or a SAS cable. The SAS is an abbreviation for serial attached small computer system interface (SCSI). The apparatus which is SCSI-connected may constitute a storage area network (SAN).

The NAS 2 is an example of the network storage 11 illustrated in FIG. 5. The NAS 2 is equipped with an NFS server function and may provide one or more file systems 20 to the business server 4. For example, the NAS 2-1 may provide the file system 20-1 to the business server 4, and the NAS 2-2 may provide the file system 20-2 to the business server 4.

The NAS 2 may support a file provision protocol in addition to the NFS protocol. As the file provision protocol, for example, there is a server message block (SMB) protocol or the like in addition to the NFS protocol.

The NAS 2 may have a plurality of storage apparatuses as the storage area of the file system 20. A redundant arrays of inexpensive disks (RAID) may be configured by a plurality of storage apparatuses. As the storage apparatus, for example, there is a magnetic disk apparatus such as a hard disk drive (HDD) or a semiconductor drive apparatus such as a solid state drive (SSD).

The business server 4 is an example of the host apparatus 14 illustrated in FIG. 5. In the business server 4, a business of a client using the NFS may be operated. The business server 4 may have an NFS client 40 as a functional configuration. The NFS client 40 accesses the file system 20 mounted in the NAS 2 using a standard NFS protocol.

The proxy server 3 is an example of the relay apparatus 13 illustrated in FIG. 5. The proxy server 3 may be installed between the business server 4 and the one or more NAS 2 (a middle layer) and relay communication between the business server 4 and the one or more NAS 2. For example, the proxy server 3 may relay an I/O request using the standard NFS protocol from the business server 4 to either or both of the NASs 2-1 and 2-2.

Further, the proxy server 3 may have a function of performing migration of a designated file system 20 and be able to perform a plurality of migrations between an old NAS 2 and a new NAS 2.

As the proxy server 3 and the business server 4, there is an information processing apparatus, for example, a computer such as server or a personal computer (PC).

As described above, in the information processing system 1, the proxy server 3 implements the on-line migration of the NAS 2 in cooperation with the business server 4 and the NAS 2 based on the proxy function of relaying the request from the NFS client 40 to the NAS 2. Further, the proxy server 3 enables the migration between NASs 2 of the same or different vendors or the same or different model using the standard NFS protocol which is independent of a vendor or a model.

[1-3] Exemplary Functional Configuration of Proxy Server

Next, an exemplary functional configuration of the proxy server 3 will be described. As illustrated in FIG. 6, the proxy server 3 may illustratively include a migration processing unit 31, an information storage unit 32, and a proxy processing unit 33 as an example.

The migration processing unit 31 is an example of the migration processing unit 131 illustrated in FIG. 5. The migration processing unit 31 performs a migration process on the file system 20 of the NAS 2 in response to a migration initiation instruction from the business server 4.

As illustrated in FIG. 6, the migration processing unit 31 may include an initial copy unit 311, a full copy unit 312, a differential copy unit 313, a management unit 314, and a database (DB) unit 315.

The migration process by migration processing unit 31 may be managed in 3 phases of an initial copy, a full copy, and a differential copy (see FIG. 7) in order to implement the migration without stopping a business. The phases may be executed on the background by the initial copy unit 311, the full copy unit 312, and the differential copy unit 313 of the migration processing unit 31, respectively. Hereinafter, the initial copy unit 311, the full copy unit 312, and the differential copy unit 313 may be referred to collectively as "copy units 311 to 313."

The management unit 314 creates, updates, deletes, or refers to information stored in the DB unit 315 and information stored in the information storage unit 32. In the migration, the copy units 311 to 313 may access the DB unit 315 and the information storage unit 32 using the management unit 314 or instead of the management unit 314.

The DB unit 315 is an example of a log management unit that stores and manages logging information 316. The logging information 316 is used, for example, to specify an object to be processed by the differential copy unit 313. The DB unit 315 may be implemented by a magnetic disk apparatus, a semiconductor drive apparatus, a non-volatile storage apparatus such as a flash memory, or the like.

The information storage unit 32 is an example of the memory unit 132 illustrated in FIG. 5. The information storage unit 32 stores and manages the metadata management information 321, the object management information 322, and the copy management information 323 (hereinafter, referred to collectively as "management information 321 to 323"). The information storage unit 32 may be implemented by a volatile storage apparatus such as a random access memory (RAM) or may be implemented by a non-volatile storage apparatus such as a flash memory. The logging information 316 and the management information 321 to 323 will be described later.

The proxy processing unit 33 is an example of the request processing unit 134 illustrated in FIG. 5. The proxy processing unit 33 executes the NFS request received from the NFS client 40 of the business server 4 on the file system 20.

The file system 20 of the NFS access destination may be decided (selected) in accordance with a type of NFS request, that is, the reference-related NFS request or the updated-related NFS request, the phase of the migration process, a migration state of the migration related to the target object of the NFS request, or the like.

As illustrated in FIG. 6, the proxy processing unit 33 may include a migration cooperation unit 331. For example, when the updated-related NFS request is received, the migration cooperation unit 331 may instruct the management unit 314 to determine the NFS access destination.

The instruction to determine the NFS access destination may be executed, for example, when the updated-related NFS request is access to the file system 20 which is to undergo the migration. The proxy processing unit 33 executes the updated-related NFS request using the information of the NFS access destination acquired from the management unit 314 through the migration cooperation unit 331.

Further, the migration cooperation unit 331 may give an instruction to update the information in the information storage unit 32 with the determination of the NFS access destination and the execution of the updated-related NFS request.

As described above, the migration cooperation unit 331 and the management unit 314 are an example of a selection unit (for example, the selection unit 133 illustrated in FIG. 5) that selects either or both of the migration source file system 20 and the migration target file system 20 when the write request is received.

Hereinafter, when a cooperation (coordination) process by the migration cooperation unit 331 and the management unit 314 is described, the migration cooperation unit 331 and the management unit 314 are referred to collectively as an acquiring/setting unit 34 (see FIG. 6).

[1-4] Phase Management

The phase management in the migration processing unit 31 will be described below with reference to FIG. 7. Hereinafter, the migration source file system 20-1 is also referred as a "source 20-1," and the migration target file system 20-2 is also referred as a "target 20-2."

Data or the like to be copied from the source 20-1 to the target 20-2 by the copy units 311 to 313 may be deleted from the source 20-1 at arbitrary timing after the execution of the migration, after the migration of the business, or the like. In other words, "copy" of the data or the like and "deletion" after that corresponds to "movement (transfer)" as seen before and after the execution of the migration. In the following description, when "copy" is simply stated, it may include that data or information is "deleted" from source 20-1 at arbitrary timing after "copy."

[1-4-1] Initial Copy Phase

Figure 7:
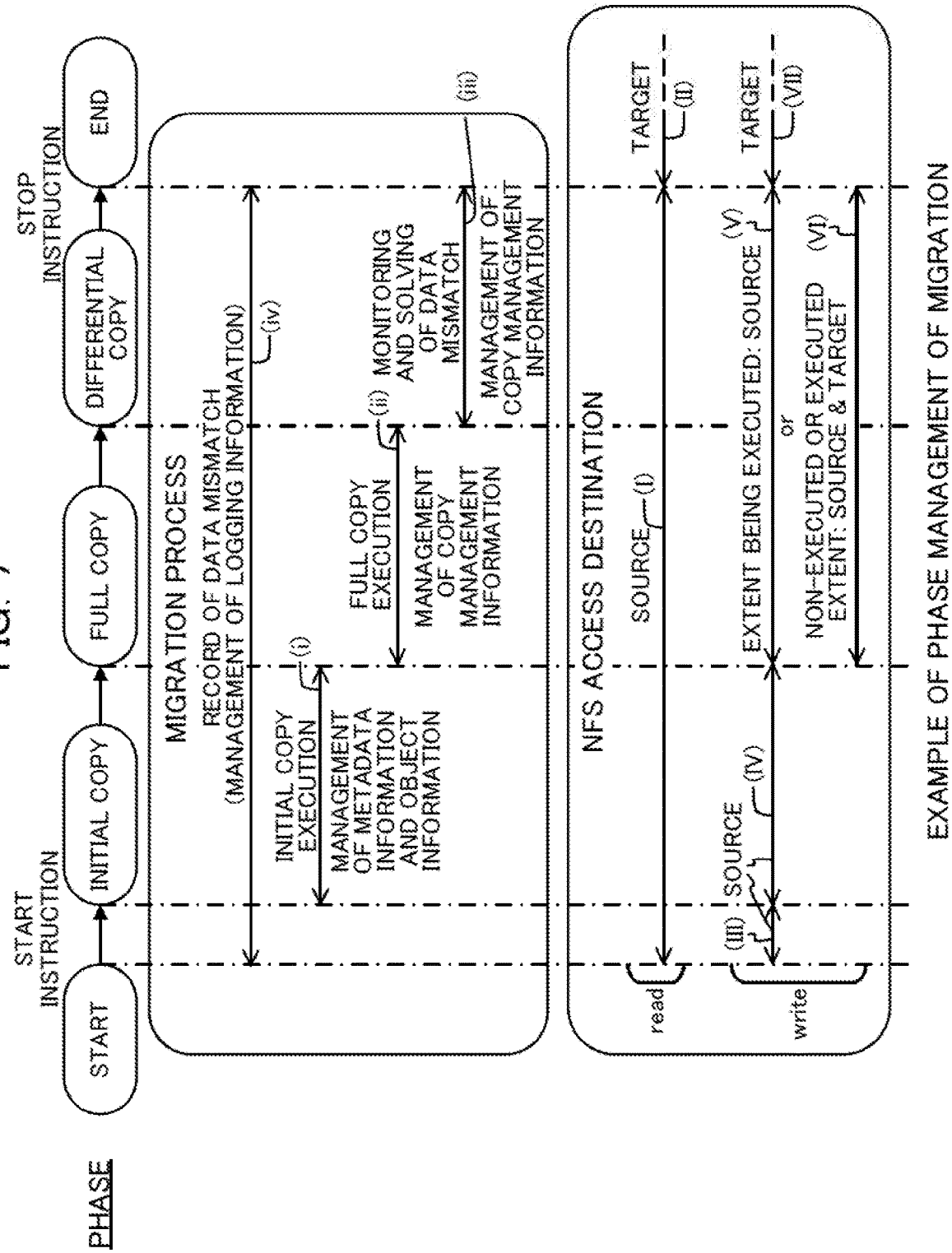
FIG. 7 is a diagram for describing an example of phase management of a migration processing unit.

The initial copy phase is a phase in which the initial copy unit 311 copies the metadata, the attribute information, and the like of the source 20-1 to the target 20-2 (an arrow (i) in FIG. 7). At this time, for normal files, a stub may be created in the target 20-2.

For example, the initial copy phase may be implemented on all files or directories in the file system 20 in accordance with the migration initiation instruction given from the business server 4.

For example, the initial copy unit 311 may acquire all pieces of directory hierarchy information from the root of the source 20-1 as a base point and execute the following processing on the target 20-2.

Normal file: a stub of a file (a 0-byte file) is created.
Non-normal file: data of the same attribute (an owner, a permission, and the like) as the source 20-1 is created.
Since it is able to be created in a short time unlike the normal file, stub conversion may be omitted.

Examples of "non-normal file" include a character file, a block file, a symbolic link, a socket, a first-in first-out (FIFO), a directory, or the like.

The initial copy unit 311 may create or update the metadata management information 321 managing the hierarchy of the directory or the file or the like and the object management information 322 which is an example of the control information used in the migration control.

As described above, the initial copy phase is an example of the initial migration process of migrating the attribute information of the object to be stored in the source 20-1 to the target 20-2 before the full copy phase is executed.

The files for which the initial copy is completed may sequentially transition to the full copy phase. In the full copy phase, full copy may be performed on a plurality of files in parallel.

[1-4-2] Full Copy Phase

The full copy phase is a phase in which the full copy unit 312 copies data of the file of the source 20-1 to the stub created in the target 20-2 in the initial copy phase (an arrow (ii) in FIG. 7).

For example, the full copy unit 312 may move all pieces of data of the file by acquiring data of a predetermined size sequentially from the head of the file of the source 20-1 and copying it to the target 20-2. As described above, in the full copy phase, data of the object is copied in units of data areas having a predetermined size. The data area having the predetermined size is also referred to as an "extent."

In other words, the full copy unit 312 copies the entire file by dividing the file into units of extents and copying the divided data sequentially. The full copy unit 312 may use the standard NFS protocol for access to the source 20-1 and the target 20-2.

The full copy unit 312 may create the copy management information 323 managing the progress status of the full copy related to the target object in units of extents. The full copy unit 312 may determine execution, skipping, re-execution, or the like of the data copy in the full copy phase with reference to the copy management information 323 and delete the copy management information 323 when the full copy phase ends.

As described above, the full copy phase is an example of the first migration process of migrating the migration source file system 20-1 to the migration target file system 20-2 for the file system 20 included in the one or more NASs 2.

The files for which the full copy is completed may sequentially transition to the differential copy phase. In the differential copy phase, differential copy may be performed on a plurality of files in parallel.

[1-4-3] Differential Copy Phase

The differential copy phase is a phase in which the differential copy unit 313 monitors and solves a data mismatch state of the files of the source 20-1 and the target 20-2 for the files for which the full copy is completed (an arrow (iii) in FIG. 7). For example, the differential copy unit 313 detects data in the mismatch state (differential data) and copies the data from the source 20-1 to the target 20-2 in units of extents (differential copy).

The differential copy unit 313 may create the copy management information 323. The differential copy unit 313 may determine execution, skipping, re-execution, or the like of the data copy in the differential copy phase with reference to the copy management information 323 and may delete the copy management information 323 when the differential copy phase ends.

Further, the differential copy unit 313 may specify a file of a differential copy target in the differential copy phase with reference to the logging information 316.

The logging information 316 is an example of information indicating an object in which the data mismatch occurs between the migration source file system 20 and the migration target file system 20. The mismatch state of the data may refer to a state in which there is data that does not match in the files of the source 20-1 and the target 20-2.

The logging information 316 may be managed by the acquiring/setting unit 34 until the migration is completed (for example, until a stop instruction is received from the business server 4) after the migration processing unit 31 is activated (an arrow (iv) in FIG. 7).

As described above, the differential copy phase is an example of a second migration process of executing when the full copy phase is completed and maintaining an equivalent state between the migration source file system 20 and the migration target file system 20.

The differential copy phase may be carried out until the stop instruction is received from the business server 4.

[1-5] Selection of NFS Access Destination

As described above, the NFS access destination by the proxy processing unit 33 that has received the NFS request may be selected by the acquiring/setting unit 34 implemented by the migration cooperation unit 331 and the management unit 314.

Next, an example of a selection condition for the NFS access destination by the acquiring/setting unit 34 will be described below with reference to FIGS. 7 to 9. FIG. 9 is a diagram illustrating an example of the NFS access destination during the execution of the migration.

[1-5-1] Reference-Related Request (See "Read" in FIG. 7 and "Reference-Related" in FIG. 8)

As illustrated in FIG. 9, the acquiring/setting unit 34 selects the source 20-1 as the NFS access destination when receiving the reference-related NFS request for the file system 20 before the migration is executed or during the execution of the migration (see an arrow (I) in FIG. 7).

On the other hand, when the reference-related NFS request for the file system 20 after the migration is executed (for example, after the stop instruction is received) is received, the acquiring/setting unit 34 selects the target 20-2 as the NFS access destination (an arrow (II) in FIG. 7). It is because the business is continuously operated in the target 20-2 after the execution of the migration.

[1-5-2] Updated-Related Request (See "Write" in FIG. 7 and "Updated-Related" in FIG. 8)

(A) Before Migration is Executed

When the updated-related NFS request for the file system 20 before the migration is executed is received, the acquiring/setting unit 34 selects the source 20-1 as the NFS access destination (an arrow (III) in FIG. 7). This is because the migration is not executed, and the business is being operated in the source 20-1.

(B) After Migration is Executed

When the updated-related NFS request for the file system 20 after the migration is executed is received, the acquiring/setting unit 34 selects the target 20-2 as the NFS access destination (an arrow (VII) in FIG. 7). It is because the business is continuously operated in the target 20-2 after the migration is executed.

(C) When Migration is being Executed

When receiving the updated-related NFS request for the file system 20 during the execution of the migration, the acquiring/setting unit 34 selects the following file system 20 according to the copy phase being executed.

(C-1) in Case of Initial Copy Phase

When the updated-related NFS request for the object in the initial copy phase is received, the acquiring/setting unit 34 selects the source 20-1 as the NFS access destination (an arrow (IV) in FIG. 7). This is because the file updated in the source 20-1 is copied to the target 20-2 in the full copy phase after the initial copy phase.

(C-2) in Case of Full Copy Phase or Differential Copy Phase

Next, an example in which the updated-related NFS request for the object in the full copy phase or the differential copy phase (for example, see "file for which the migration has not been completed (during migration)" in FIG. 9) is received will be described. In this case, the acquiring/setting unit 34 selects the following file system 20 in accordance with a copy execution state of the extent of the access target.

(C-2-1) in Case of Updated-Related NFS Request for Extent in which Copy is being Executed In this case, as illustrated in a table of FIG. 8, an extent which is a target of the updated-related NFS request and an extent in which copy is being executed overlap. In other words, an address of the extent in which copy is being executed is included in an address range of the NFS access destination by the updated-related NFS request.

In this case, the acquiring/setting unit 34 selects the source 20-1 as the NFS access destination (an arrow (V) in FIG. 7).

As described above, when the updated-related NFS request for the extent in which copy is being executed is received, the proxy processing unit 33 executes the NFS request on the source 20-1. Accordingly, when the target 20-2 is selected as the NFS access destination, it is unnecessary to be on standby until the copy is completed, and thus it is possible to suppress the occurrence of the I/O timeout error and continue the business.

Further, when the NFS request is executed for the source 20-1, there is non-equivalent data between the file of the source 20-1 and the file of the target 20-2, and a data mismatch occurs in the file which is the target of the updated-related NFS request.

In this regard, the acquiring/setting unit 34 may set a dirty bit in an area indicating an updated extent in the copy management information 323 to be described later. The dirty bit is information of encouraging the migration processing unit 31 to re-execute the copy of an extent in which copy is being executed in the full copy phase or the differential copy phase.

In the NFS request executed on the source 20-1, the full copy or the differential copy is re-executed through the management of the dirty bit, and thus it is possible to maintain the consistency of data.

The acquiring/setting unit 34 may set information indicating a data mismatch in the logging information 316 to be described later in addition to a setting of the dirty bit in the copy management information 323.

(C-2-2) in Case of Updated-Related NFS Request for Extent in which Copy is not Executed or Copy is Executed In this case, as illustrated in the table of FIG. 8, an extent which is the target of the updated-related NFS request and an extent in which copy is being executed do not overlap. In other words, an address of the extent in which copy is not executed or already executed is included in the address range of the NFS access destination by the updated-related NFS request.

In this case, the acquiring/setting unit 34 selects both the source 20-1 and the target 20-2 as the NFS access destination (an arrow (VI) in FIG. 7).

For example, when the file is updated in the business server 4, the NFS client 40 designates the address range of the updated data and executes the updated-related NFS request. Since the data designated by the updated-related NFS request is in the latest state, when the data is reflected in the target 20-2 at a timing at which the NFS request is received is reflected, the data copy in the migration is unnecessary, and it is possible to reduce the time demanded for the migration.

In order to skip the data copy in the migration for the extent in which the data in the latest state is reflected, the acquiring/setting unit 34 may set the information indicating that the extent has been copied in the copy management information 323.

For example, the acquiring/setting unit 34 may set a copied flag in the copy management information 323 for all extents serving as an access target of the updated-related NFS request. When the full copy or the differential copy is performed, the migration processing unit 31 may skip the execution of the full copy or the differential copy for the extent in which the copied flag is set with reference to the copy management information 323.

Further, when the updated-related NFS request is executed on the source 20-1 in addition to the target 20-2, it is possible to maintain the consistency of data between the source 20-1 and the target 20-2. Accordingly, it is possible to prevent the data loss when one NAS 2 has a failure during the execution of the migration and improve the reliability of the system.

Further, the updated-related NFS request may abnormally end in either of the source 20-1 and the target 20-2 due to an abnormality of the NAS 2 or the network (not illustrated). In this case, there is non-equivalent data in the files of the source 20-1 and the target 20-2, and a data mismatch occurs.

In this regard, the acquiring/setting unit 34 may set the dirty bit in an area indicating an extent of an update target in the copy management information 323 to be described later based on an execution result of the updated-related NFS request.

The acquiring/setting unit 34 may set information indicating the data mismatch in the logging information 316 to be described later in addition to the setting of the dirty bit in the copy management information 323.

Further, the full copy and the differential copy are performed in units of extents. On the other hand, the address range for which the updated-related NFS request is intended may include an address range of the entire file or address ranges of a plurality of extents. Thus, both an "extent in which copy is being executed" and an "extent in which copy is not executed or already executed" may be included in the address range for which the updated-related NFS request is intended.

In this case, the source 20-1 is selected for the "extent in which copy is being executed" included in the address range of the updated-related NFS request, and both the source 20-1 and the target 20-2 may be selected for the "extent in which copy is not executed or already executed."

As described above, the acquiring/setting unit 34 dynamically switches the NFS access destination in accordance with the type of the NFS request, the state of the migration, and the like. Accordingly, it is possible to prevent a completion delay of the NFS request which is caused since it is on standby until the completion of the data copy by the migration processing unit 31.

[1-6] Description of Information Stored in Information Storage Unit and DB Unit

Next, an example of information stored in the information storage unit 32 and the DB unit 315 will be described with reference to FIGS. 10 to 20. In the description of FIGS. 10 to 20, various kinds of information stored in the information storage unit 32 and the DB unit 315 are illustrated in a format suitable for the description, for example, a model format, a list format, a table format, a map, or the like indicating a relation between information. However, the information is not limited to the formats illustrated in FIGS. 10 to 20 and may be stored in the information storage unit 32 and DB unit 315 in various formats or forms such as an arrangement, a DB, a bitmap, or the like.

[1-6-1] Information Storage Unit

Figure 10:
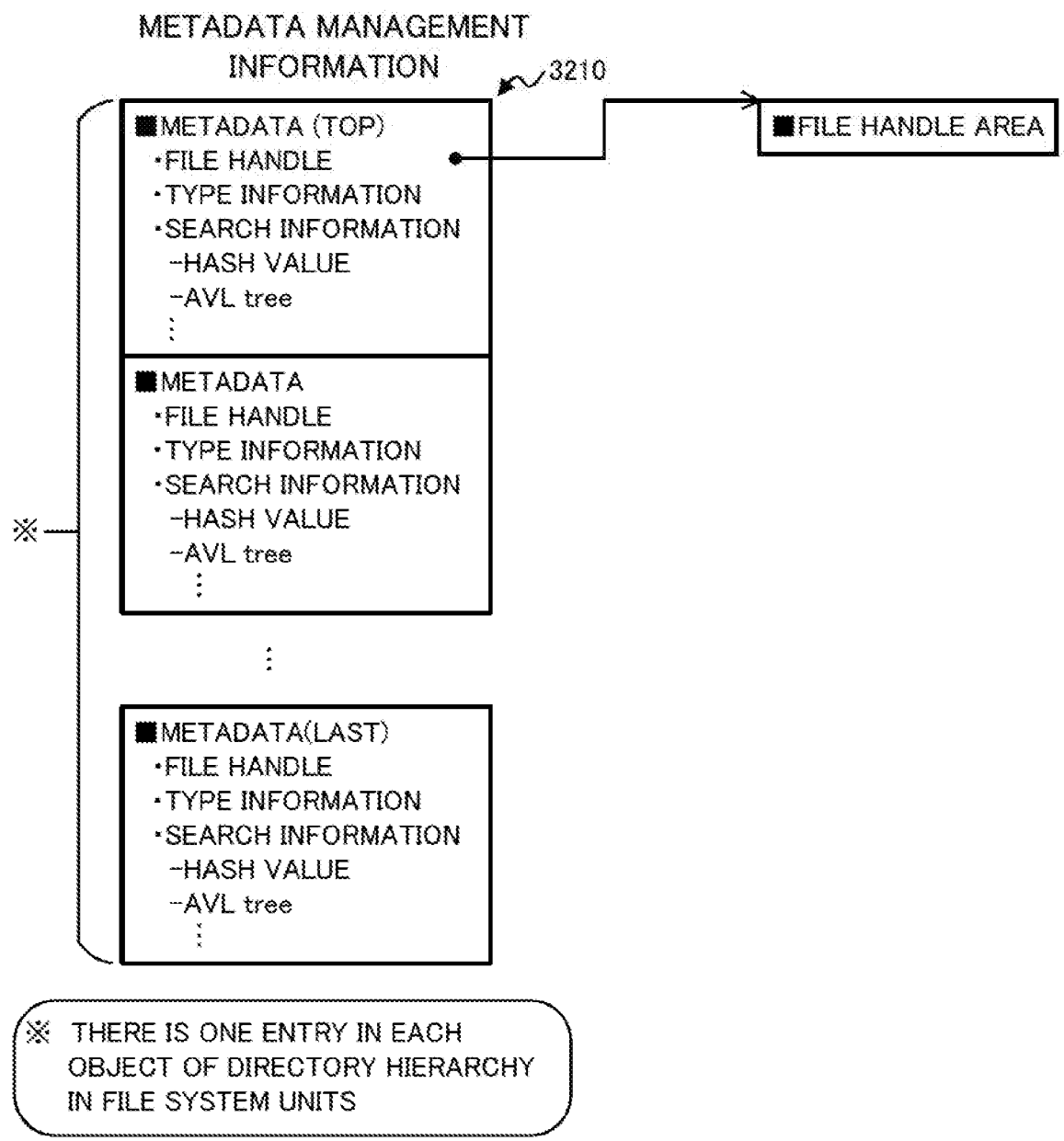
FIG. 10 is a diagram illustrating an example of metadata management information according to a comparative example.

FIG. 10 is a diagram illustrating an example of metadata management information 3210 according to the comparative example. For example, the metadata management information 3210 may be present in each of the file systems 130-1 and 130-2 in the information processing system 100 illustrated in FIG. 1.

In the metadata management information 3210, there is one entry in each object of the directory hierarchy in units of file systems 130. Information such as "FILE HANDLE," "type information," "search information," "HASH VALUE," "AVL tree," and the like are set in each entry.

A pointer to a file handle area of the object is set in the "FILE HANDLE."—The file handle is unique control information within the file system 130 which is used for reference to a directory or a file. The file handle is allocated by the file system 130 when a directory or a file is created. The NFS client 150 is able to acquire the file handle from the file system 130 (the NFS server), designate the file handle through the NFS protocol, and access a directory or a file.

The "type information" is information indicating a type such as a directory or a file. The "search information" is information used for a search of an object and may include HASH VALUE, AVL tree which is an example of a binary search tree, and the like.

Figure 11:
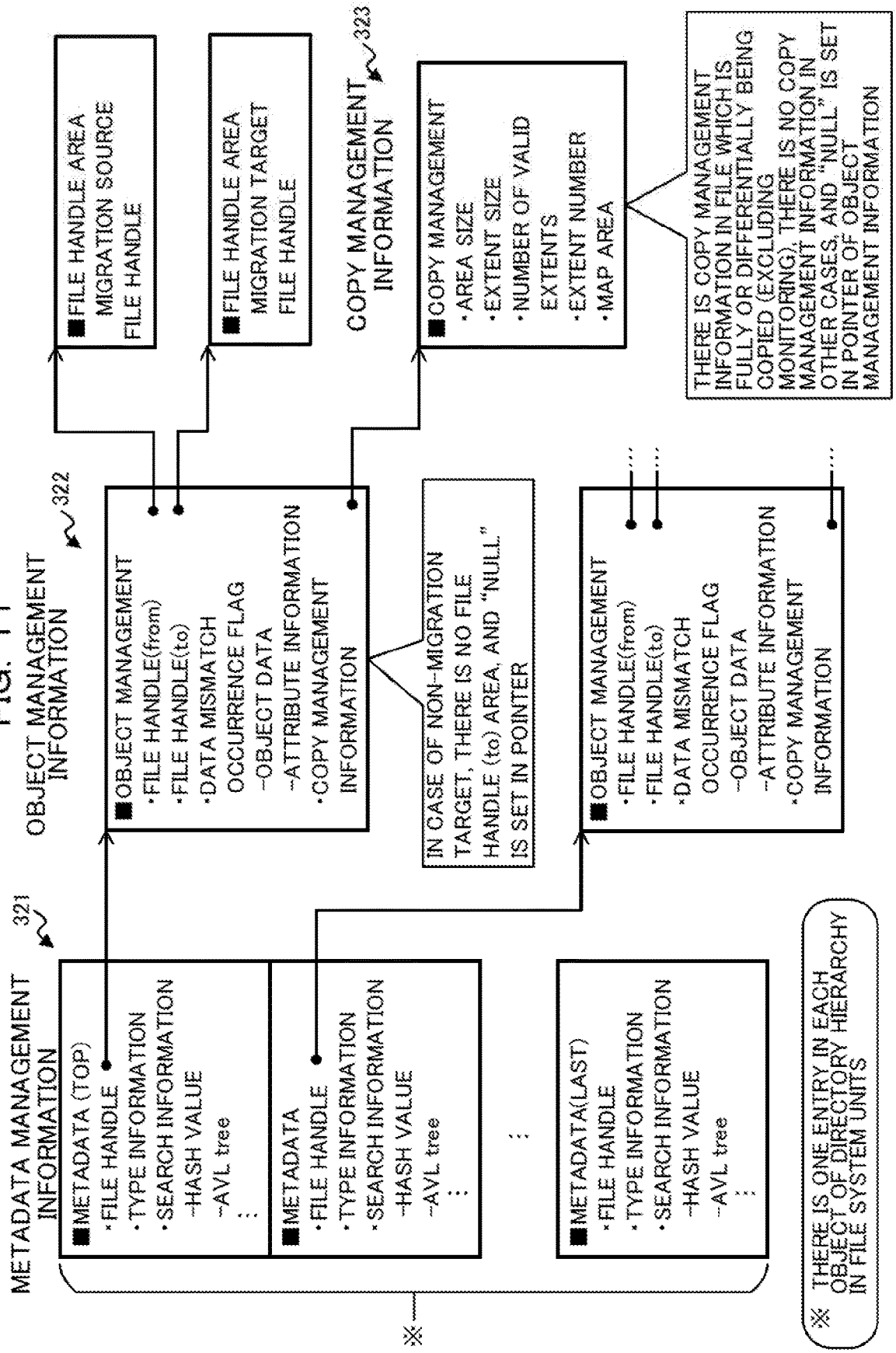
FIG. 11 is a diagram illustrating an example of information stored in an information storage unit.

On the other hand, as illustrated in FIG. 11, the information storage unit 32 according to one embodiment stores the management information 321 to 323. As illustrated in FIG. 11, the management information 321 to 323 may be positioned as management information obtained by extending the function of the metadata management information 3210.

The metadata management information 321 illustrated in FIG. 11 may be, for example, an area managing the metadata of the source 20-1 in the file system 20.

The metadata management information 321 differs from the metadata management information 3210 illustrated in FIG. 10 in a pointer set in the "FILE HANDLE." A pointer to an entry of the object in the object management information 322 may be set in the "FILE HANDLE" of the metadata management information 321.

"FILE HANDLE (from)," "FILE HANDLE (to)," and a "data mismatch occurrence flag" may be set in the entry of each object in the object management information 322 as illustrated in FIG. 11. Information such as "OBJECT DATA," "attribute information," and "copy management information" may be further set in the entry.

A pointer to the file handle area of the object stored in the source 20-1 may be set in the "FILE HANDLE (from)." A pointer to the file handle area of the object to be stored in the target 20-2 may be set in the "FILE HANDLE (to)."

Further, when the object is not the migration target, the area of the "FILE HANDLE (to)" does not exist, and for example, "NULL" may be set in the pointer.

The "data mismatch occurrence flag" may manage an operation of the user, for example, an operation from the NFS client 40 for the file being executing of the migration through the migration processing unit 31.

The "OBJECT DATA" may include information related to a type and a name of an object. The "attribute information" may include attribute information of an object, for example, information related to an access authority, an owner, or the like.

A pointer to an entry of the object in the copy management information 323 may be set in the "copy management information." The entry exists when the object is undergoing the full copy or the differential copy, and in other cases, the entry does not exist. Therefore, when the entry does not exist, "NULL" may be set in the pointer of the "copy management information." The copy management information 323 will be described later in detail.

As described above, in the information storage unit 32, the object management information 322 from which objects of the migration source and the migration target are able to be acquired is interposed between the metadata management information 321 and the file handle area, and the copy management information 323 is linked from the object management information 322.

Accordingly, the migration processing unit 31 is able to acquire the migration target object and the migration state. Further, it is possible to dynamically select the NAS 2 of the NFS access destination in accordance with the migration state and enable the NFS request to be executed without depending on the data copy of the migration, and thus it is possible to prevent the occurrence of the I/O timeout of the NFS access.

Next, the "data mismatch occurrence flag," the "OBJECT DATA," and the "attribute information" included in the object management information 322 will be described.

Figure 12:
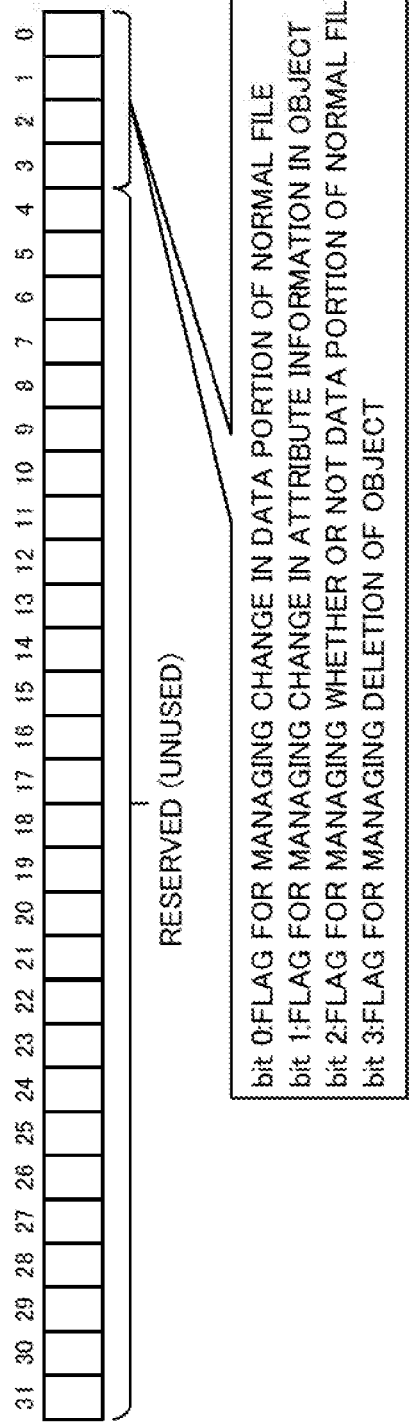
FIG. 12 is a diagram illustrating an example of a data mismatch occurrence flag.

As illustrated in FIG. 12, the "data mismatch occurrence flag" may be implemented by a 4-byte data area of 4 bytes in which bits 0 to 3 are used, and bits 4 to 31 are reserved (unused). In the example of FIG. 12, the following flags are set in the bits 0 to 3.

Bit 0: a flag for managing a change in a data portion of the normal file.

Bit 1: a flag for managing a change of the attribute information of the object.

Bit 2: a flag for managing whether or not the data portion of the normal file is cut.

Bit 3: a flag for managing deletion of the object.

The migration processing unit 31 may check a setting state of the data mismatch occurrence flag after the full copy is executed in the full copy phase or after the differential copy is executed in the differential copy phase in the migration of each file. Then, the migration processing unit 31 may perform an equivalent process of the file when any one flag indicates the occurrence of the mismatch state (for example, ON). The equivalent process may include, for example, a retry of the migration process (in this case, copy of the file or an extent), update of the attribute information, or the like.

Each flag may be set to ON by the acquiring/setting unit 34 at a change timing by the proxy processing unit 33 and released (set to OFF) by the migration processing unit 31 (the management unit 314) at a timing at which the equivalent process by the migration processing unit 31 is completed.

When all flags in the data mismatch occurrence flag are OFF, it indicates that no mismatch state has occurred, and thus the equivalent process by the migration processing unit 31 is unnecessary.

A type indicated by a 32-bit integer and a name indicated in a text format of 4096 bytes may be set in the "OBJECT DATA" as illustrated in FIG. 13.

A value illustrated in FIG. 13 may be set in the type in accordance with the type of an object, for example, a normal file, a symbolic link, a directory, or the like. An object name may be stored in the name.

A plurality of management information indicated by a 32-bit unsigned integer may be set in the "attribute information" as illustrated in FIG. 14. For example, the management information may include a "mode" indicating an access authority (reading, writing, and execution authorities) of an object, an "owner" indicating an identification number allocated to an owner of an object, and the like as illustrated in FIG. 14.

Figure 15:
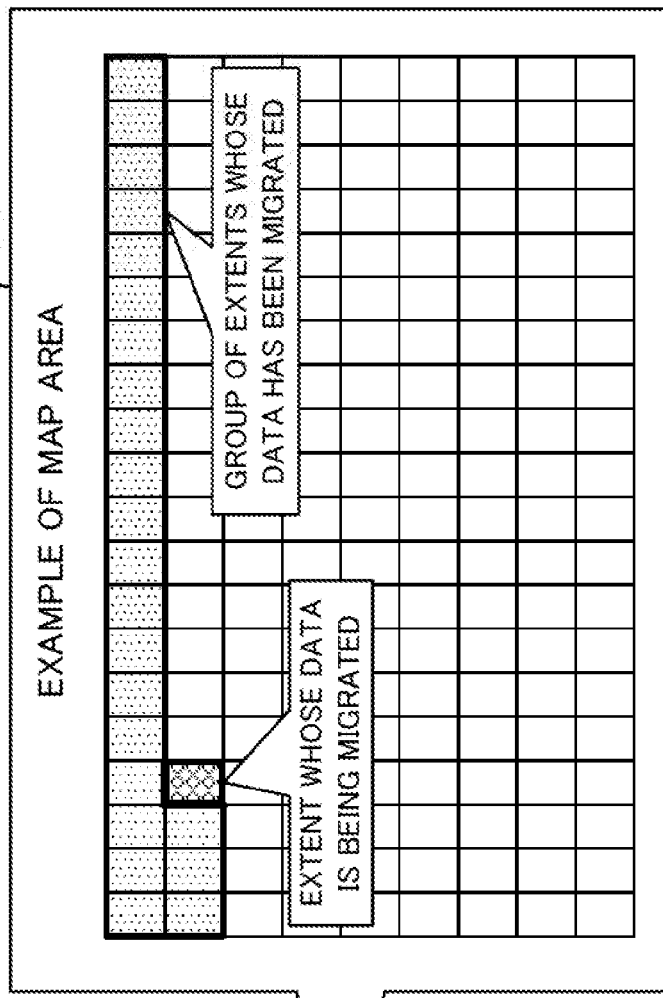
FIG. 15 is a diagram illustrating an example of copy management information.

An "area size," an "extent size," a "number of valid extents," an "extent number which is being migrated," and a "map area" may be set in the entry of each object in the copy management information 323 as illustrated in FIG. 15.

A size of an object, that is, the size of a file may be set in the "area size." A size of an extent set for each file may be set in the "extent size." The number of extents of the copy target per file may be set in the "number of valid extents." For example, a quotient obtained by dividing the "area size" by the "extent size" (round up after the decimal point) may be set in the "number of valid extents."

For example, a number (for example, a serial number) specifying an extent may be allocated to an extent in order from the head of the file. A corresponding number specifying an extent in which the data movement is being performed may be set in the "extent number which is being migrated."

A map area 324 illustrated in FIG. 15 may be set in the "map area." A pointer to the map area 324 may be set in the "map area."

The map area 324 may be, for example, a bitmap managing the progress of the data movement in units of extends for the object.

As described above, the migration processing unit 31 implements division movement of the file data with a fixed size through the copy management information 323 which manages the progress of the migration. Accordingly, it is possible to narrow a contention range between the NFS request of the business server 4 and the copy access of the migration and enables migration of a large capacity file which is frequently accessed such as a system image of a virtual environment.

Figure 16:
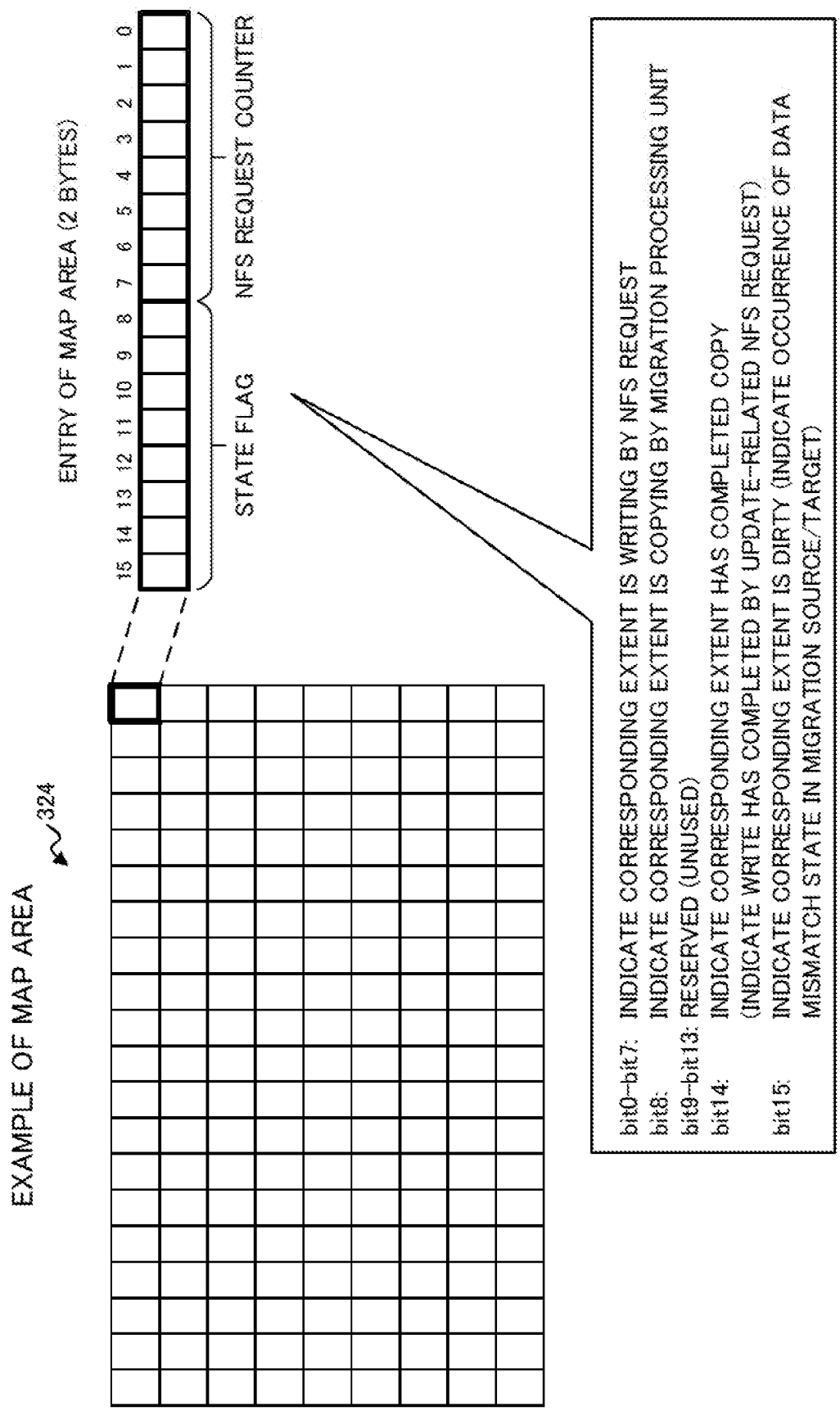
FIG. 16 is a diagram illustrating an example of entries of a map area.

The entry indicating the progress of each extent in the map area 324 may be implemented by a 2-byte data area including a request counter of bits 0 to 7 and a status flag of bits 8 to 15 as illustrated in FIG. 16. In the example of FIG. 16, the following information is set in the bits 0 to 15.

- Bits 0 to 7: an execution counter indicating that writing is being performed in the extent in accordance with the NFS request.
- Bit 8: a copying flag indicating that copy is being performed in the extent by the migration processing unit 31.
- Bits 9 to 13: reserved (unused).
- Bit 14: a copied flag indicating that copy has been performed in the extent (written in accordance with the updated-related NFS request).
- Bit 15: a dirty flag indicating that the extent is dirty (the occurrence of a data mismatch state in the migration source/target).

In the file system 20, a plurality of NFS requests are able to be executed for one file simultaneously. For this reason, when it is managed whether or not writing is being performed in an extent in accordance with the NFS request using bits, state transitions of a plurality of NFS requests (from the start to the end) are unable to be correctly managed.

In this regard, in the state transition of the NFS request, in order to indicate that a plurality of threads perform writing in the same extent, the number of writes in the same extent is managed using an execution counter of 1 byte (bits 0 to 7) instead of the flag. Since 1 byte (bits 8 to 15; including reserved) is allocated to the migration state flag, the entry of the map area 324 has a 2-byte configuration as described above.

When the counter value of the execution counter is not "0," the migration processing unit 31 may determine that writing is in process and stop the copy process until the counter becomes "0" (writing ends). Accordingly, it is possible to give a priority to the user access and suppress the occurrence of the I/O request error.

The copying flag is set to ON when the copy of the extent is initiated by the migration processing unit 31 (see FIG. 17) and set to OFF when the copy ends. The acquiring/setting unit 34 may set the dirty flag to ON when the update-related NFS request for the extent is received.

Figure 17:
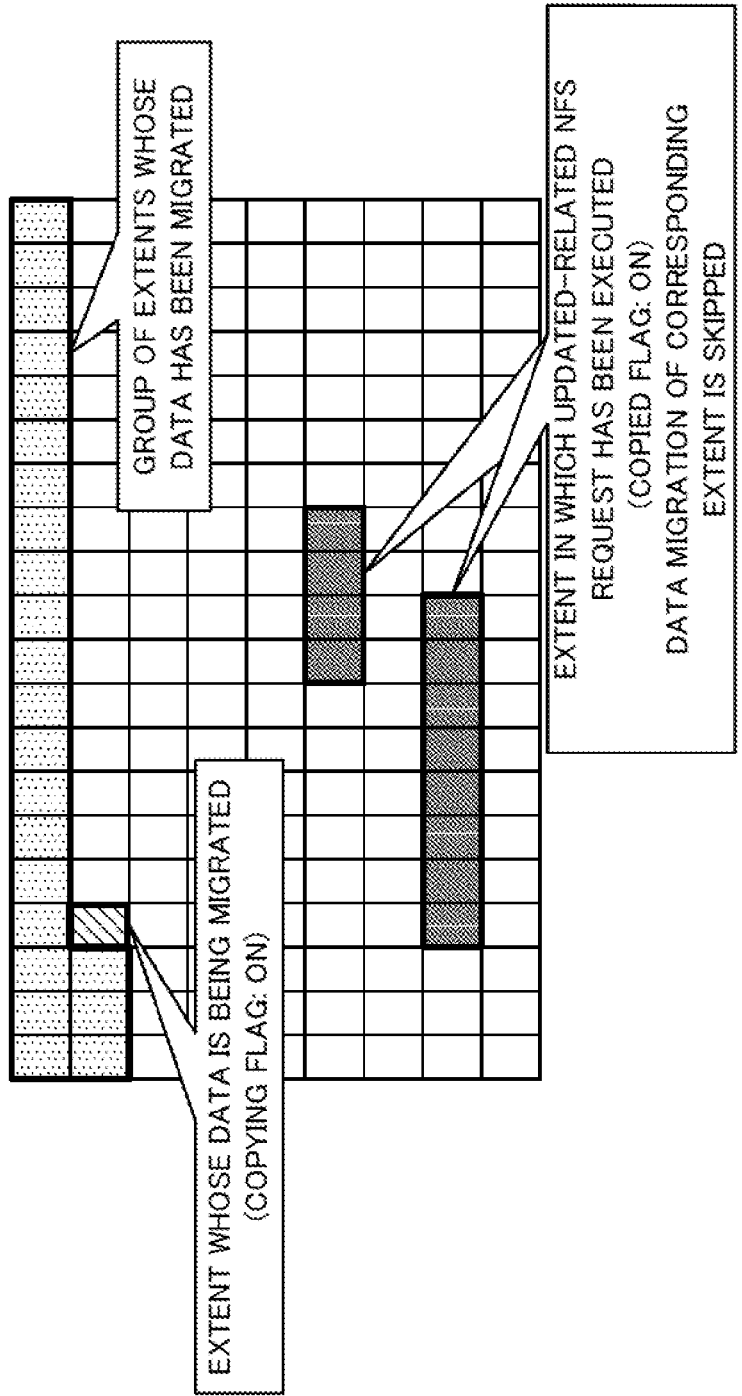
FIG. 17 is a diagram illustrating an example of a map area in which ON is set in a copied flag.

The acquiring/setting unit 34 sets the copied flag to ON when the proxy processing unit 33 executes the updated-related NFS request in both the source 20-1 and the target 20-2 (see FIG. 17). When the flag is ON, the migration processing unit 31 may skip the copy of the extent. Accordingly, it is possible to bypass (avoid) unnecessary copying of data updated by the updated-related NFS request for the extent which is being executing of the migration.

Figure 18:
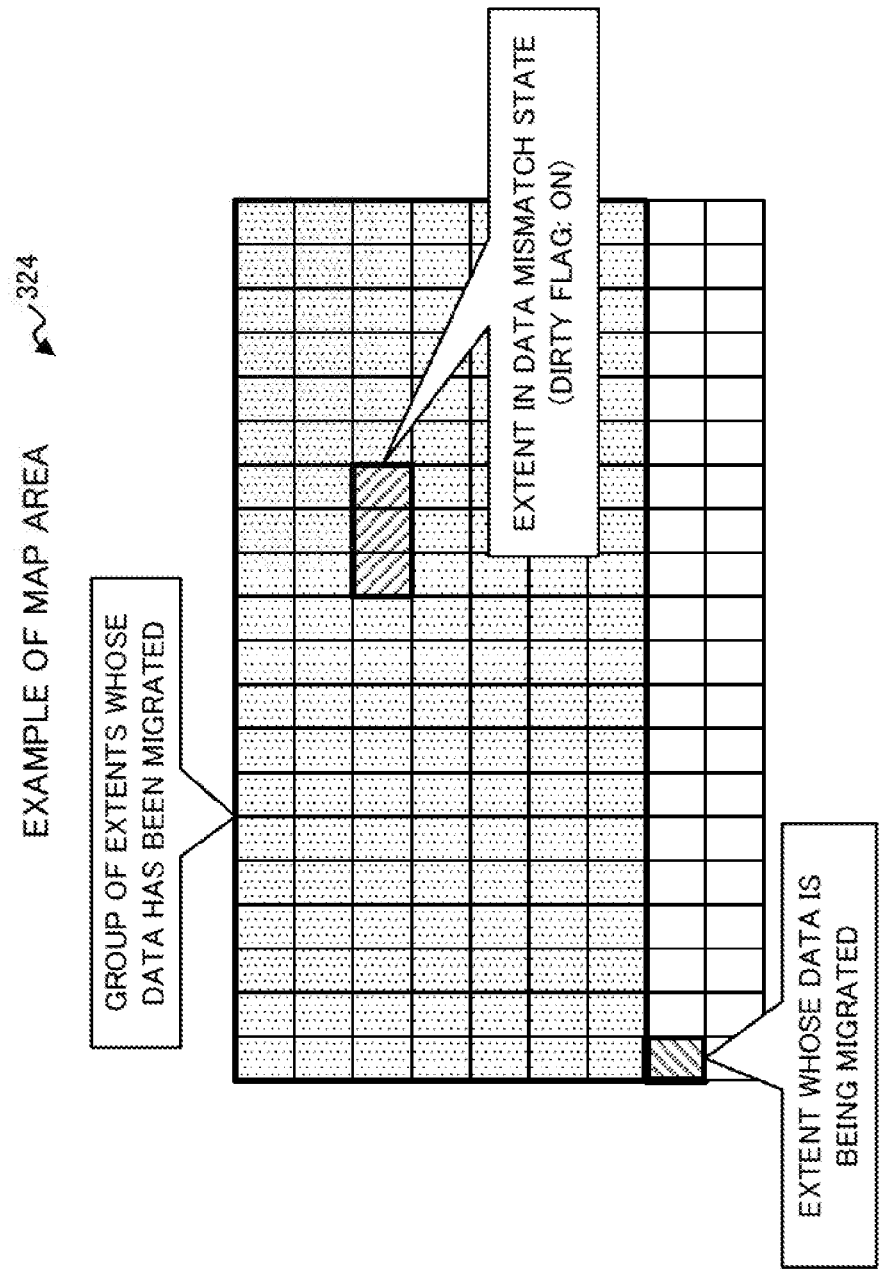
FIG. 18 is a diagram illustrating an example of a map area in which ON is set in a dirty flag.
Figure 20:
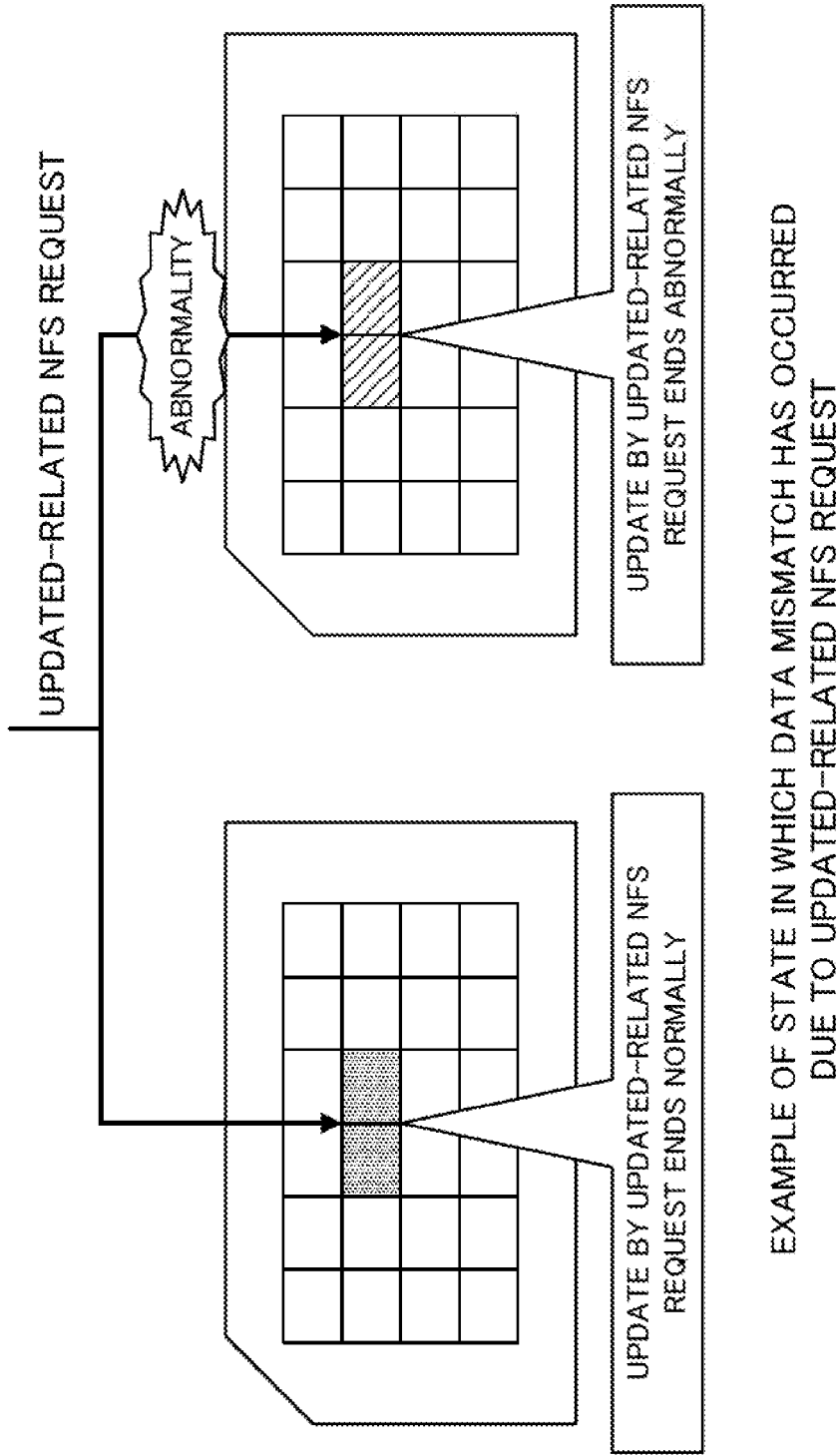
FIG. 20 is a diagram illustrating an example of a state in which a data mismatch has occurred due to an updated-related NFS request.

The migration processing unit 31 may check the dirty bit in the full copy and the differential copy (the differential copy for solving the mismatch) and perform (retry) the copy process on the extent in which the bit of the dirty flag is set ON (see FIG. 18).

[1-6-2] DB Unit

FIG. 19 is a diagram illustrating an example of the logging information 316 stored in the DB unit 315. "Export_ID," "FILE HANDLE," "migration flag," and "matching flag" may be set in the logging information 316 as illustrated in FIG. 19.

An NFS export ID of the file system 20 in which file is stored may be set in "Export_ID." The proxy server 3 is able to perform the migration processes of a set of the source 20-1 and the target 20-2 for a plurality of sets in parallel. Thus, "Export_ID" may be set in the logging information 316 in order to distinguish a plurality of migration processes.

A pointer to the NFS file handle area of the file added to the logging information 316 may be set in "FILE HANDLE."

The migration state, for example, "unprocessed," "in progress," or "completion" may be set in "migration flag."

Information indicating whether or not the data mismatch has occurred in the source 20-1 and the target 20-2 because there is an abnormality in access by the updated-related NFS request, for example, "normal" or "abnormal" may be set in the "matching flag."

For example, when the migration is initiated in the full copy phase, the migration processing unit 31 may add an entry in which "Export_ID," "FILE HANDLE," and "migration flag: in process" are set in the logging information 316. Further, when the migration (full copy) of the file is completed, the migration processing unit 31 may set "migration flag: completed" and "matching flag: normal" in the entry of the file.

[1-7] Management of Data Mismatch State

As described above, the proxy processing unit 33 executes the updated-related NFS request for the extent in which the data movement has been completed (the movement has not been completed) in both the source 20-1 and the target 20-2. At this time, when a temporary error occurs in the network or the file system 20, the data mismatch occurs between the source 20-1 and the target 20-2 (see FIG. 20).

In one embodiment, in order to suppress the memory usage of the proxy server 3, the mismatch state may be managed by two methods using a memory and a DB in accordance with the migration state. The setting of the mismatch state may be performed by the acquiring/setting unit 34 in accordance with an instruction of the proxy processing unit 33, and the solving of the mismatch state may be performed by the migration processing unit 31 (for example, the differential copy unit 313).

[1-7-1] Management by Map Area

As illustrated in FIG. 18, the data mismatch state of the file which is undergoing the full copy and the differential copy (the differential copy for solving the mismatch) is managed through the map area 324 and solved in the full copy phase or the differential copy phase (the differential copy). The acquiring/setting unit 34 determines the occurrence of the data mismatch from an access range destination of the updated-related NFS request and an access result, and when the mismatch state is detected, the acquiring/setting unit 34 sets the dirty bit indicating the mismatch state in the target extent as described above (See FIG. 18).

The migration processing unit 31 may check the dirty bit in the full copy and the differential copy (the differential copy for solving the mismatch) and execute (retry) the copy process on the extent in which the bit of the dirty flag is set to ON.

The migration processing unit 31 (the management unit 314) may delete the copy management information 323 for each file for which the full copy phase is completed or may delete the copy management information 323 for each file for which the differential copy in the differential copy phase is completed.

Management based on logging information

On the other hand, the data mismatch occurred in the file in the differential copy phase (while the occurrence of the mismatch is being monitored) is managed through the logging information 316 illustrated in FIG. 19 and solved in the differential copy phase (monitoring phase).

When the data mismatch of the file occurs in the full copy phase or the differential copy phase, the acquiring/setting unit 34 may set "matching flag: abnormal" in the entry of the file. The data mismatch occurs, for example, when writing to the target 20-2 fails or when writing is performed in an extent which is being migrated in the source 20-1.

In the differential copy phase, the migration processing unit 31 (the differential copy unit 313) may execute the differential copy on the file in which "matching flag: abnormal" is recorded based on the logging information 316 at arbitrary timing such as predetermined time intervals and solve the data mismatch.

When writing of a file that has not been migrated fails, the acquiring/setting unit 34 may add the entry of the file to the logging information 316. "Export_ID," "FILE HANDLE," "migration flag: unprocessed," and "matching flag: abnormal" may be set in the entry. When the file of the entry is migrated, the migration processing unit 31 may update the entry to "migration flag: completed" and "matching flag: normal."

As described above, in the copy management information 323, the copy state is managed through the map area 324 in units of extents. Thus, when the copy management information 323 is stored in the information storage unit 32 for all the files in the source 20-1 which is to undergo the migration, a lot of memory areas are used, and the performance of the proxy server 3 is likely to be affected.

In this regard, the consistency of the files which have been copied is managed using the logging information 316 in the DB unit 315 which is a non-volatile storage apparatus (a HDD, an SSD, or the like), and thus it is possible to suppress the performance deterioration of the proxy server 3. Further, even when power supply to the proxy server 3 is interrupted due to a failure or the like, the logging information 316 does not disappear, and thus it is possible to manage the mismatch state of the data normally even after the recovery from the failure, and it is possible to use it for maintaining the equivalent state between the source 20-1 and the target 20-2.

[1-8] Exemplary Operations

Next, exemplary operations of the information processing system 1 according to one embodiment will be described with reference to FIGS. 21 to 31.

[1-8-1] Exemplary Overall Operation

First, an exemplary overall operation in the information processing system 1 will be described with reference to FIGS. 21 to 23.

Figure 21:
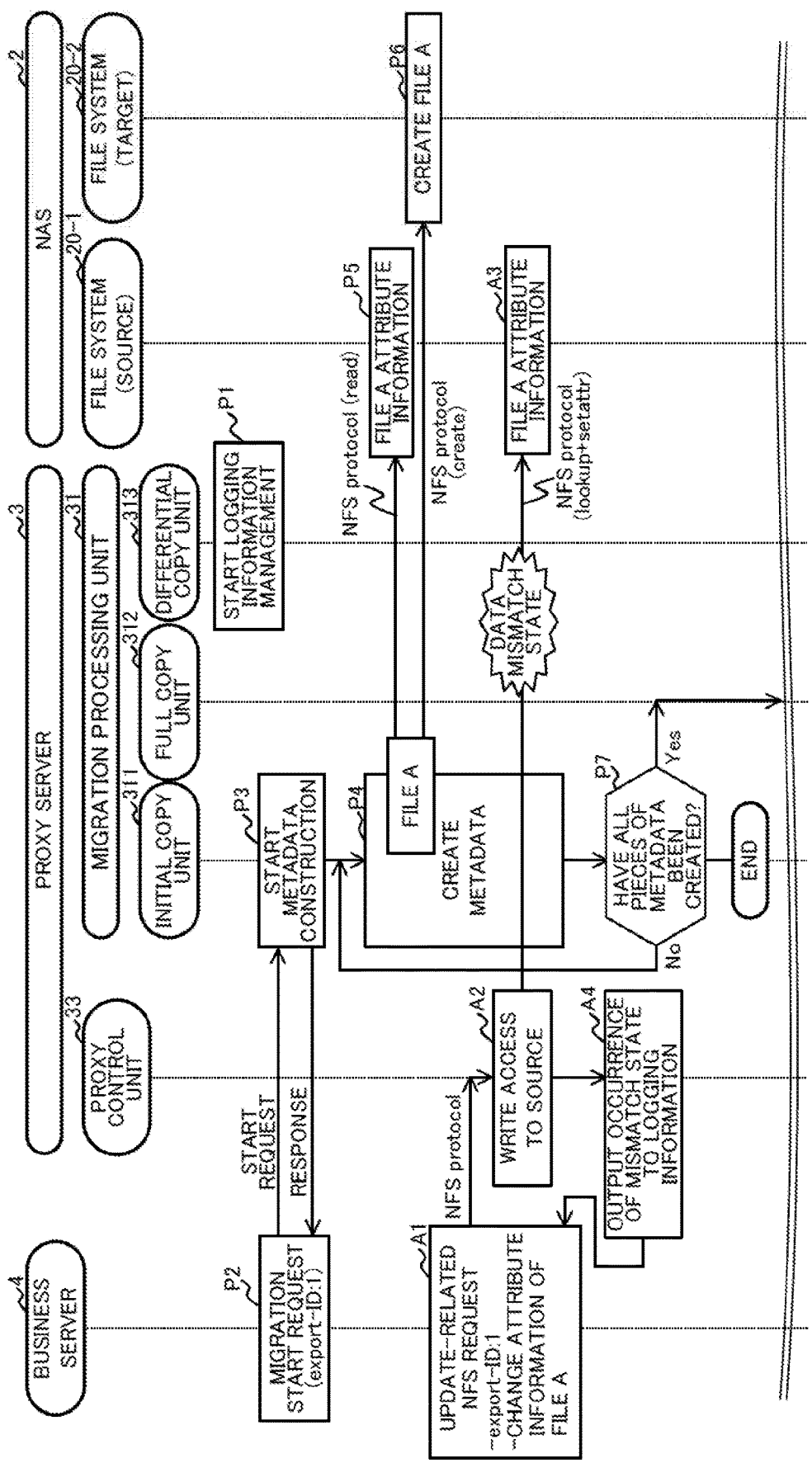
FIG. 21 is a flowchart for describing an exemplary overall operation in an information processing system.

As illustrated in FIG. 21, migration processing unit 31 (for example, the differential copy unit 313 or the management unit 314) starts management of the logging information 316 (process P1).

The NFS client 40 of the business server 4 transmits a migration start request (export-ID: 1) (process P2). The initial copy unit 311 starts metadata construction (process P3), transmits a response to the business server 4, and creates metadata (process P4).

For example, when metadata of a file A is created, the initial copy unit 311 instructs the source 20-1 to read attribute information of the file A through the read operation of the NFS protocol (process P5). Then, the initial copy unit 311 causes the target 20-2 to create the file A through the create operation of the NFS protocol using the read attribute information (process P6). At this time, the file A is in the stub state.

The initial copy unit 311 determines whether or not the creation of all pieces of metadata is completed (process P7), and when there is any one piece of metadata which is not created (No in process P7), the process proceeds to P4. On the other hand, when the creation of all pieces of metadata is completed (Yes in process P7), the process proceeds to P8 in FIG. 22. Then, the operation of the initial copy phase of export-ID: 1 by the initial copy unit 311 is completed.

A case in which the NFS client 40 transmits the updated-related NFS request (export-ID: 1) for changing the attribute information of the file A in the initial copy phase is considered (process A1). In this case, the proxy processing unit 33 performs the write access to the source 20-1 (process A2) and instructs the source 20-1 to update the attribute information of the file A through lookup and setattr operations of the NFS protocol (process A3).

At this time, the mismatch occurs in the attribute information of the file A in the source 20-1 and the target 20-2. In this regard, the proxy processing unit 33 (or the acquiring/ setting unit 34) outputs information indicating the occurrence of the mismatch state to the logging information 316 (process A4) and transmits a response to the business server 4.

Figure 22:
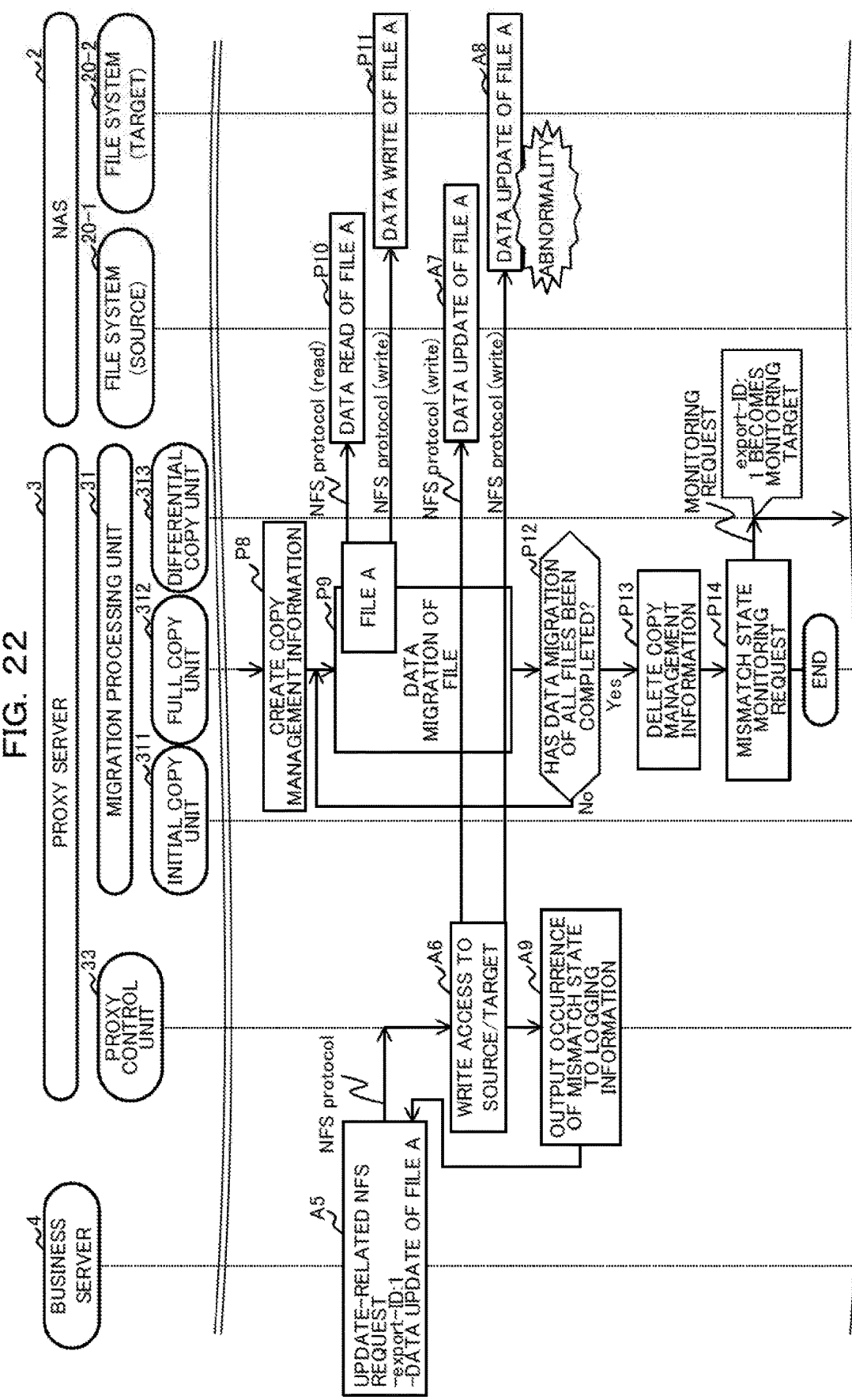
FIG. 22 is a flowchart for describing an exemplary overall operation in the information processing system.

Then, as illustrated in FIG. 22, the full copy unit 312 creates the copy management information 323 (process P8) and performs the data movement of the file (process P9).

For example, when data of the file A is moved, the full copy unit 312 instructs the source 20-1 to read data of the file A through the read operation of the NFS protocol (process P10). Then, the full copy unit 312 writes the data of the file A in the target 20-2 through the write operation of the NFS protocol using the read data (process P11). The reading and writing of the file A are performed in units of extents.

The full copy unit 312 determines whether or the data movement of all the files has been completed (process P12), and when there is a file which has not been moved (No in process P12), the process proceeds to P9. On the other hand, when the data movement of all the files is completed (Yes in process P12), the full copy unit 312 deletes the copy management information 323 (process P13).

Figure 23:
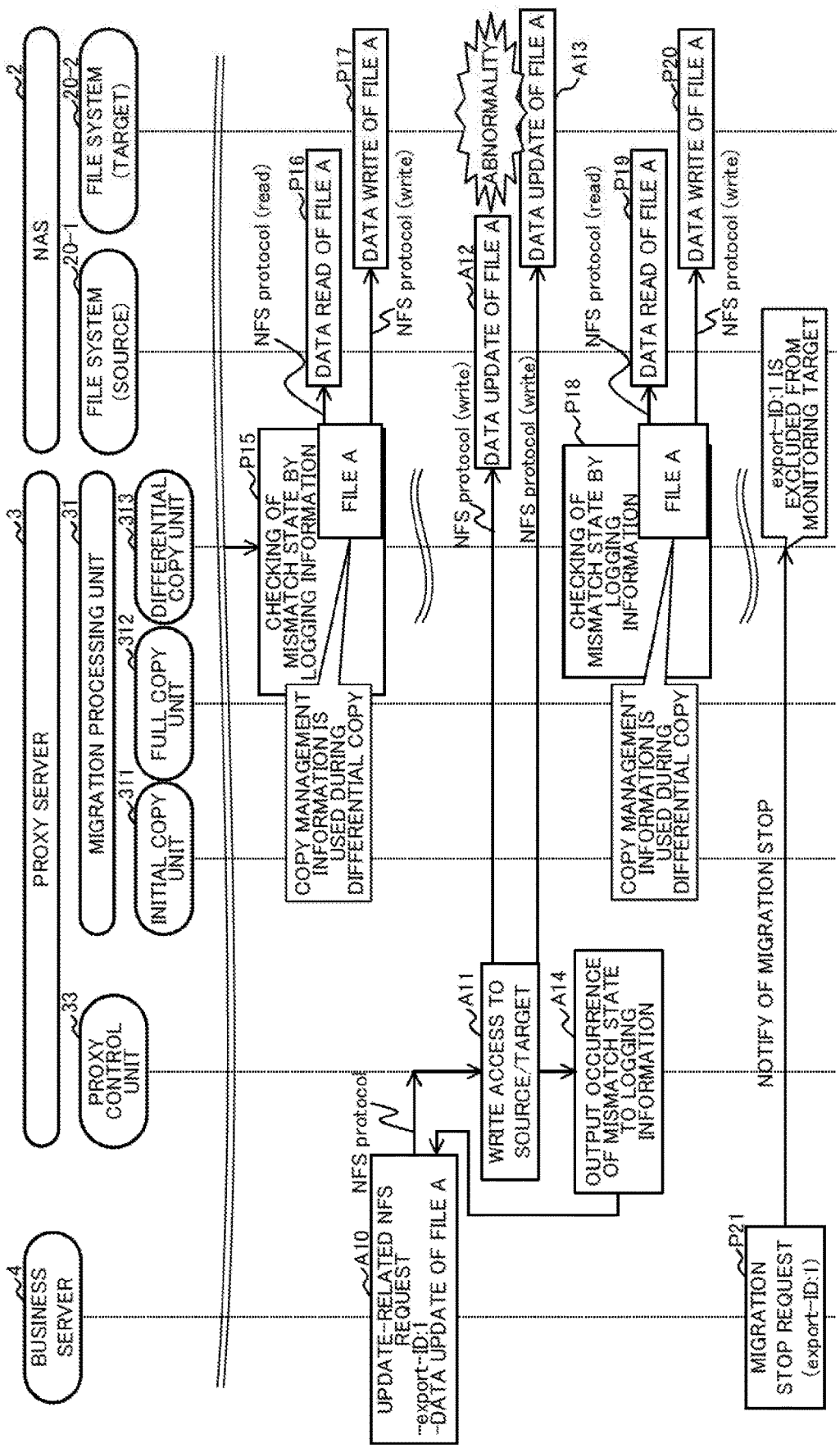
FIG. 23 is a flowchart for describing an exemplary overall operation in the information processing system.

Then, the full copy unit 312 requests the differential copy unit 313 to monitor the mismatch state (process P14), and the process proceeds to P15 in FIG. 23. Accordingly, export-ID: 1 is set as a monitoring target. The monitoring target is monitored by the differential copy unit 313. Then, the operation of the full copy phase of export-ID: 1 by the full copy unit 312 is completed.

A case in which the NFS client 40 transmits the updated-related NFS request (export-ID: 1) for updating the data of the file A after moving the file A in the full copy phase is considered (process A5). In this case, the proxy processing unit 33 performs the write access to both the source 20-1 and the target 20-2 (process A6).

For example, the proxy processing unit 33 causes both the source 20-1 and the target 20-2 to update the data of the file A through the write operation of the NFS protocol (processes A7 and A8). Here, when an abnormality occurs in the data update in the target 20-2, and the data mismatch occurs in the file A, the proxy processing unit 33 (or the acquiring/setting unit 34) outputs information indicating the occurrence of the mismatch state to the logging information 316 (process A9) and transmits a response to the business server 4.

Then, as illustrated in FIG. 23, the differential copy unit 313 checks the mismatch state based on the logging information 316 (process P15).

For example, when the data mismatch occurs in the file A, the differential copy unit 313 instructs the source 20-1 to read the data of the file A through the read operation of the NFS protocol (process P16). Then, the differential copy unit 313 writes the data of the file A to the target 20-2 through the write operation of the NFS protocol using the read data (process P17). The reading and writing of the file A are performed in units of extents.

The differential copy unit 313 creates the copy management information 323 in the differential copy of the file A, manages the progress status of the copy, and deletes the copy management information 323 when the differential copy ends.

Here, a case in which the NFS client 40 transmits the updated-related NFS request (export-ID: 1) for updating the data of the file A in the differential copy phase is considered (process A10). In this case, the proxy processing unit 33 performs the write access to both the source 20-1 and the target 20-2 (process A11).

For example, the proxy processing unit 33 causes both the source 20-1 and the target 20-2 to update the data of the file A through the write operation of the NFS protocol (processes A12 and A13). When an abnormality occurs in data update in the target 20-2, and the data mismatch occurs in the file A, the proxy processing unit 33 (or the acquiring/setting unit 34) outputs information indicating the occurrence of the mismatch state to the logging information 316 (process A14) and transmits a response to the business server 4.

The differential copy unit 313 refers to the logging information 316 at regular intervals, and for example, when the mismatch of the file A is detected, the differential copy unit 313 solves the mismatch state, similarly to processes P15 to P17 (processes P18 to P20).

When the business server 4 transmits a migration stop request (export-ID: 1) (process P21), and export-ID: 1 is excluded from the monitoring target in the differential copy unit 313. Then, the operation of the differential copy phase of export-ID: 1 by the differential copy unit 313 is completed. When export-ID: 1 is excluded from the monitoring target, the target 20-2 is the NFS access destination for both of the reference-related request and the updated-related request.

[1-8-2] Exemplary Operation of NFS Access to File System which is to Undergo the Migration Next, an exemplary operation of the NFS access to the file system 20 which is to undergo the migration will be described with reference to FIGS. 24 and 25.

Figure 24:
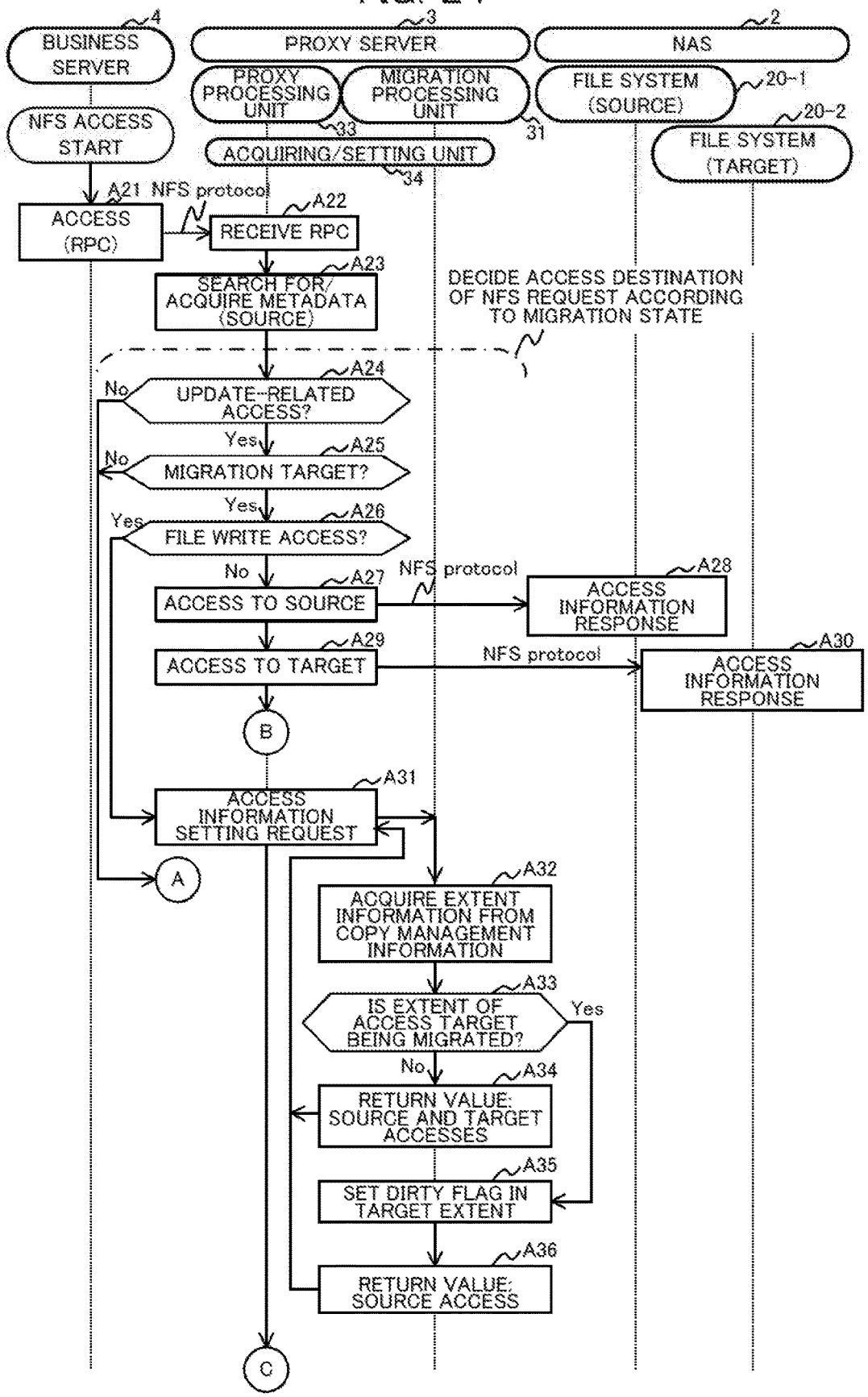
FIG. 24 is a flowchart for describing an exemplary operation of an NFS access to a file system which is to undergo the migration.

As illustrated in FIG. 24, when the business server 4 performs access (RPC) in accordance with the NFS protocol (process A21), the proxy processing unit 33 receives the RPC (process A22) and searches for or acquires the metadata for the source 20-1 (process A23).

The acquiring/setting unit 34 determines whether or not the access from the business server 4 is the updated-related request (process A24). When the access from the business server 4 is the updated-related request (Yes in process A24), the acquiring/setting unit 34 determines whether or not the access is access to the object of the migration target (process A25).

Figure 25:
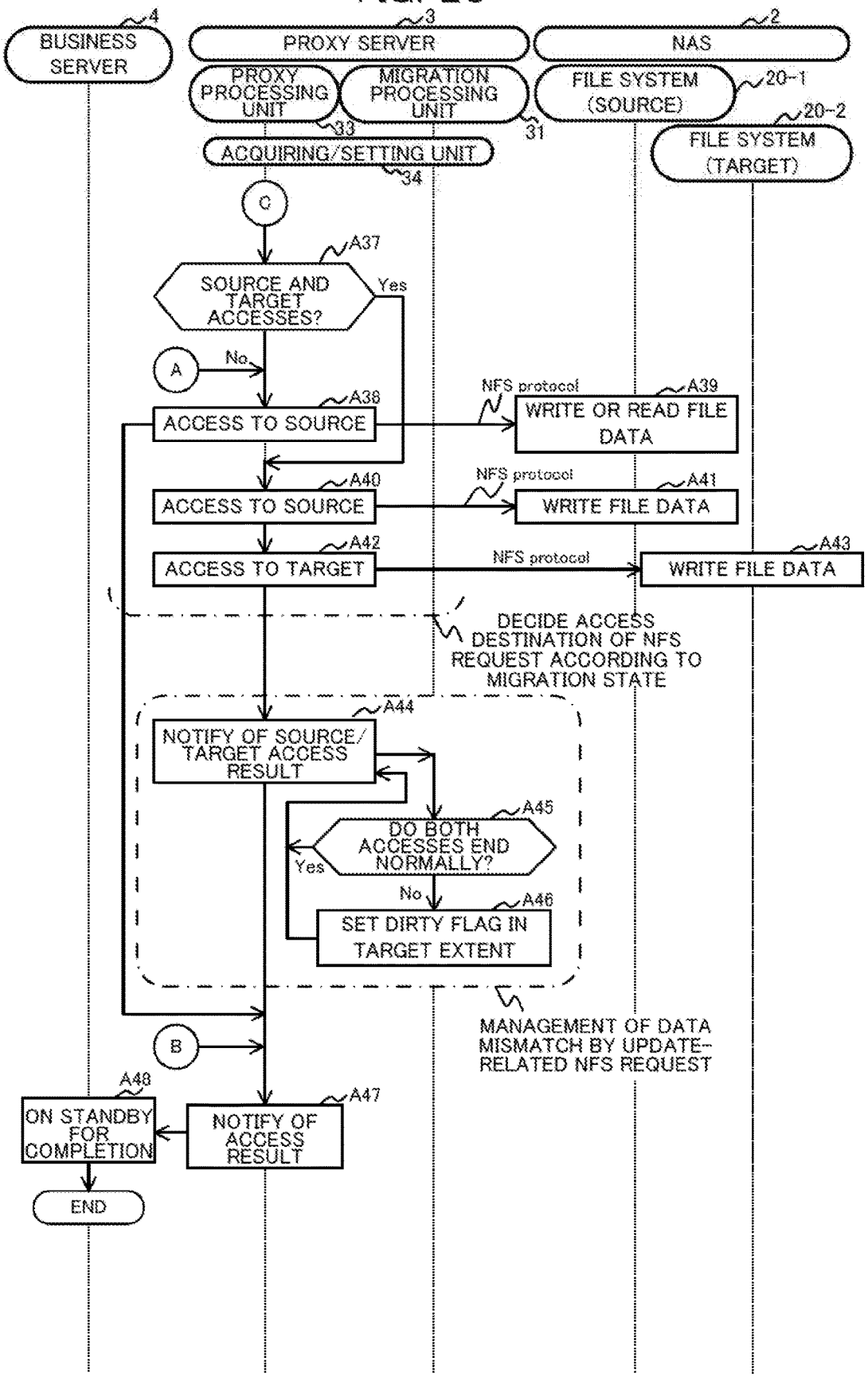
FIG. 25 is a flowchart for describing an exemplary operation of an NFS access to a file system which is to undergo the migration.

When the access is not access to the object of the migration target (No in process A25) or when the access is not the updated-related access in process A24 (No in process A24), the process proceeds to A38 in FIG. 25.

When the access is access to the object of the migration target in process A25 (Yes in process A25), the acquiring/setting unit 34 determines whether or not the access is the write access to the file (process A26). When the access is not the write access to the file (No in process A26), for example, when the access is to create a directory or change attribute information, the proxy processing unit 33 accesses the source 20-1 and the target 20-2 in accordance with the NFS protocol (processes A27 and A29).

Upon receiving a response of access information from the source 20-1 and the target 20-2 (processes A28 and A30), the process proceeds to A47 in FIG. 25.

On the other hand, when the access is the write access to the file in process A26 (Yes in process A26), the migration cooperation unit 331 of the acquiring/setting unit 34 transmits an access information setting request to the management unit 314 of the acquiring/setting unit 34 (process A31).

The management unit 314 acquires extent information from the copy management information 323 (process A32) and determines whether or not the extent of the access target is being migrated (process A33). When the extent of the access target is not being migrated (No in process A33), the management unit 314 transmits "source and target accesses" to the migration cooperation unit 331 as a return value (process A34).

On the other hand, when the extent of the access target is being migrated (Yes in process A33), the management unit 314 sets the dirty flag in the target extent of the copy management information 323 (process A35), and transmits "source access" to the migration cooperation unit 331 as the return value (process A36).

When the return value is obtained in the process A31, the proxy processing unit 33 determines whether or not the return value is the source and target accesses (process A37 in FIG. 25). When the return value is not the source and target accesses (No in process A37), the proxy processing unit 33 accesses the source 20-1 in accordance with the NFS protocol (process A38), and the source 20-1 writes the file data (process A39). In the access of the process A38 when No is determined in process A24 or process A25 in FIG. 24, the source 20-1 reads the file data in process A39.

When the return value is the source and target accesses in process A37 (Yes in process A37), the proxy processing unit 33 accesses the source 20-1 and the target 20-2 in accordance with the NFS protocol (processes A40 and A42). The source 20-1 and the target 20-2 write the file data (processes A41 and A43).

Next, the migration cooperation unit 331 gives a notification indicating a result of access to the source 20-1 and the target 20-2 to the management unit 314 (process A44), and the management unit 314 determines whether or not both of the source and target accesses end normally (process A45).

When at least one of the accesses does not end normally (No in process A45), the management unit 314 sets the dirty flag in the target extent of the copy management information 323 (process A46), and the process returns to A44. On the other hand, when both of the source and target accesses end normally (Yes in process A45), the process returns to A44.

Then, the proxy processing unit 33 gives a notification indicating the access result to the business server 4 (process A47), the business server 4 receives the notification in the completion standby state (process A48), and then the process ends.

Processes A24 to A42 are regarded to be processes related to the decision of the access destination of the NFS request according to the migration state. Processes A44 to A46 are regarded to be processes related to the management of the data mismatch by the updated-related NFS request.

[1-8-3] Exemplary Operation of Initial Copy Phase

Next, an exemplary operation of the initial copy phase will be described with reference to FIGS. 26 and 27.

Figure 26:
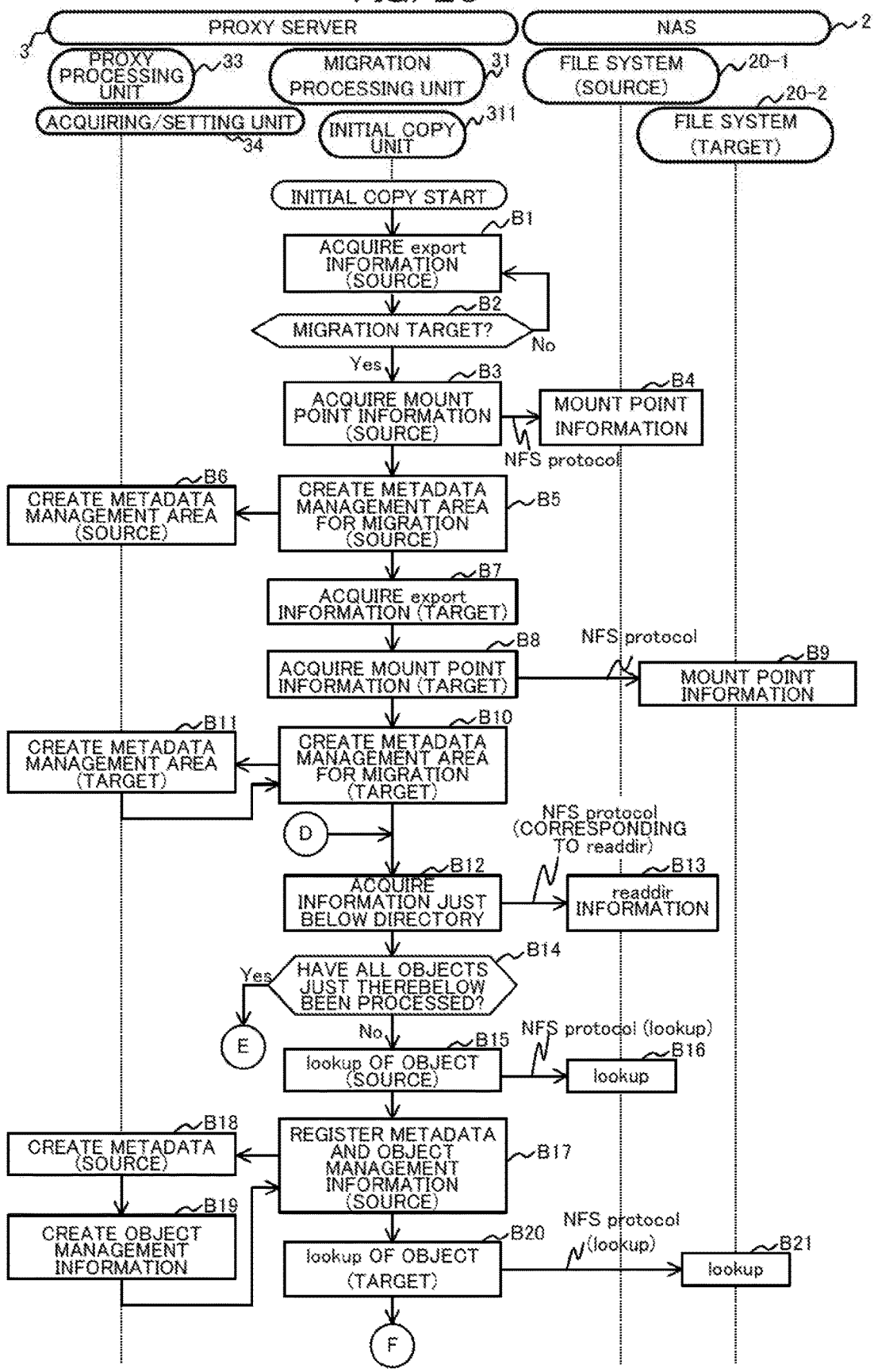
FIG. 26 is a flowchart for describing an exemplary operation of an initial copy phase.

As illustrated in FIG. 26, upon receiving the migration start request from the business server 4, the initial copy unit 311 acquires export information from the source 20-1 (process B1), and determines whether or not the source 20-1 is to undergo the migration (process B2).

When the source 20-1 is not to undergo the migration (No in process B2), switching to the next export information is performed, and the process moves to B1. On the other hand, when the source 20-1 is to undergo the migration (Yes in process B2), the initial copy unit 311 acquires mount point information from the source 20-1 in accordance with the NFS protocol (process B3), and the source 20-1 transmits the mount point information (process B4).

Then, the initial copy unit 311 requests the migration cooperation unit 331 to create the metadata management information 321 for migration related to the source 20-1 (process B5). The migration cooperation unit 331 cooperates with the management unit 314 to create the metadata management information 321 (process B6). When the metadata management information 321 has been created, processes B5 and B6 may be skipped.

Then, the initial copy unit 311 acquires the export information from the target 20-2 (process B7), and acquires the mount point information from the target 20-2 in accordance with the NFS protocol (process B8). The target 20-2 transmits the mount point information (process B9).

Then, the initial copy unit 311 requests the migration cooperation unit 331 to create the metadata management information 321 for migration related to the target 20-2 (process B10). The migration cooperation unit 331 cooperates with the management unit 314 to create the metadata management information 321 (process B11). When the metadata management information 321 has been created, processes B10 and B11 may be skipped.

The initial copy unit 311 acquires information just below the directory from the source 20-1 through an operation corresponding to readdir of the NFS protocol (process B12), and the source 20-1 transmits the readaddr information (process B13).

Figure 27:
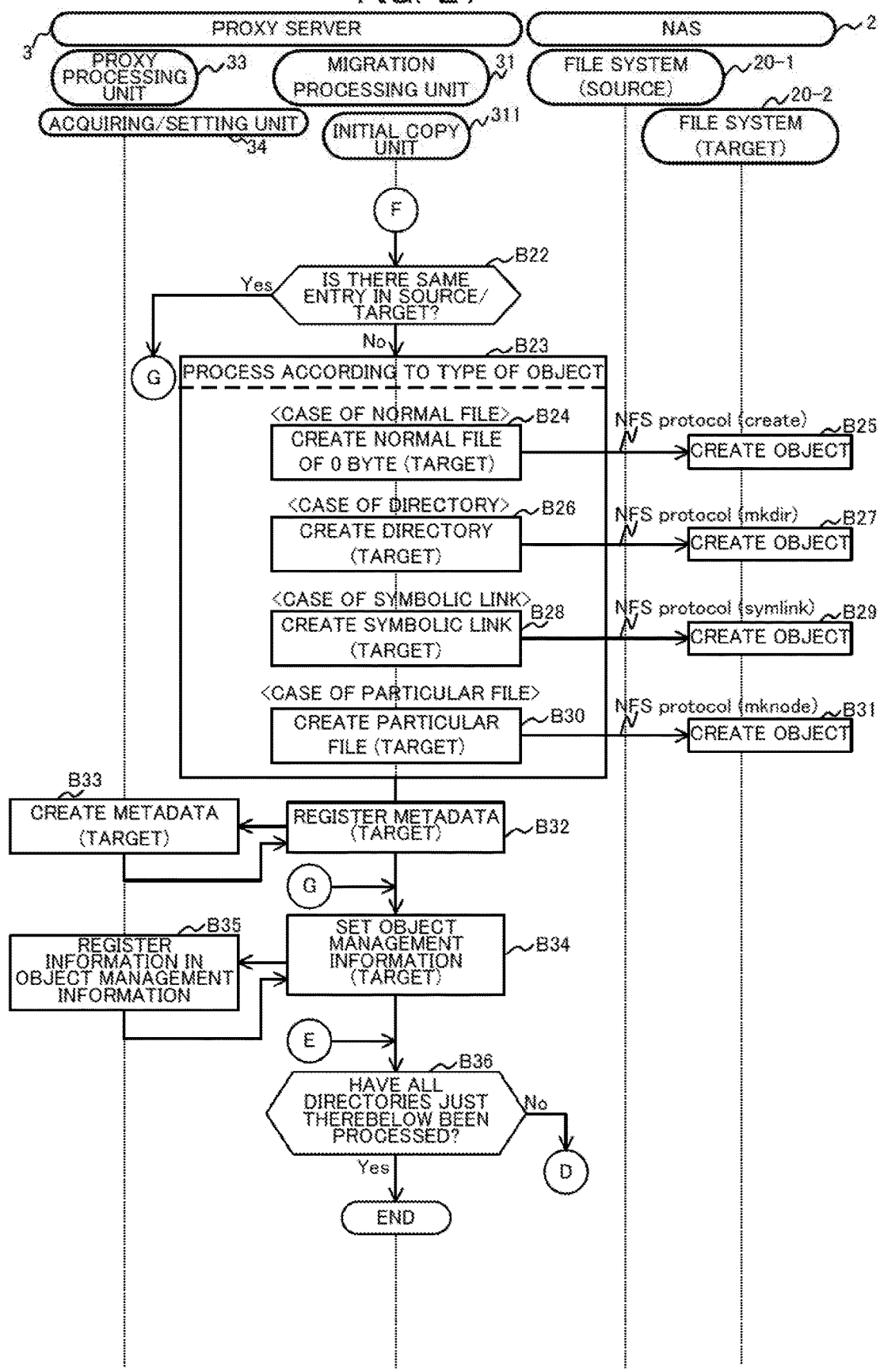
FIG. 27 is a flowchart for describing an exemplary operation of an initial copy phase.

The initial copy unit 311 determines whether or not all objects just therebelow have been processed (process B14), and when all objects just therebelow have been processed (Yes in process B14), the process proceeds to B36 in FIG. 27. On the other hand, when there is an object which has not been processed (No in process B14), the initial copy unit 311 executes the lookup of the object of the source 20-1 according to the lookup operation of the NFS protocol (process B15), and the source 20-1 transmits the lookup result (process B16).

The initial copy unit 311 requests the migration cooperation unit 331 to register the metadata and the object management information 322 related to the source 20-1 (process B17). The migration cooperation unit 331 cooperates with the management unit 314 to register the metadata and the object management information 322 (processes B18 and B19), and the process returns to B17. When the information has been created, process B18 and/or B19 may be skipped.

Then, the initial copy unit 311 executes the lookup of the object of the target 20-2 according to the lookup operation of the NFS protocol (process B20), and the target 20-2 transmits the lookup result (process B21).

Then, the initial copy unit 311 determines whether or not the same entry exists in the source 20-1 and the target 20-2 based on the lookup result (process B22), and when the same entry exists (Yes in process B22), the process proceeds to B34.

On the other hand, when the same entry does not exist (No in process B22), the initial copy unit 311 performs a process according to the type of the object (process B23).

For example, when the object is a normal file, the differential copy unit 313 instructs the target 20-2 to create a 0-byte normal file through the create operation of the NFS protocol (process B24). The target 20-2 creates the object (process B25). In the case of the normal file, the object to be created in the target 20-2 is stubbed.

When the object is a directory, the differential copy unit 313 instructs the target 20-2 to create a directory through an mkdir operation of the NFS protocol (process B26). The target 20-2 creates the object (process B27).

When the object is a symbolic link, the differential copy unit 313 instructs the target 20-2 to create the symbolic link through a symlink operation of the NFS protocol (process B28). The target 20-2 creates the object (process B29).

When the object is a special file, the differential copy unit 313 instructs the target 20-2 to create a special file through an mknode operation of the NFS protocol (process B30). The target 20-2 creates the object (process B31).

When the process according to the type of the object is completed, the initial copy unit 311 requests the migration cooperation unit 331 to register the metadata related to the target 20-2 (process B32). The migration cooperation unit 331 cooperates with the management unit 314 to register the metadata (process B33), and the process returns to B32. Then, the initial copy unit 311 requests the migration cooperation unit 331 to set the object management information 322 (process B34). The migration cooperation unit 331 cooperates with the management unit 314 to register information in the object management information 322 (process B35), and the process returns to B34.

Then, the initial copy unit 311 determines whether or not all subordinate directories have been processed (process B36), and when there is a subordinate directory which has not been processed (No in process B36), the process proceeds to B12. On the other hand, when all subordinate directories have been processed (Yes in process B36), the process ends.

[1-8-4] Exemplary Operation of Full Copy Phase

Then, an exemplary operation of the full copy phase will be described with reference to FIGS. 28 and 29.

Figure 28:
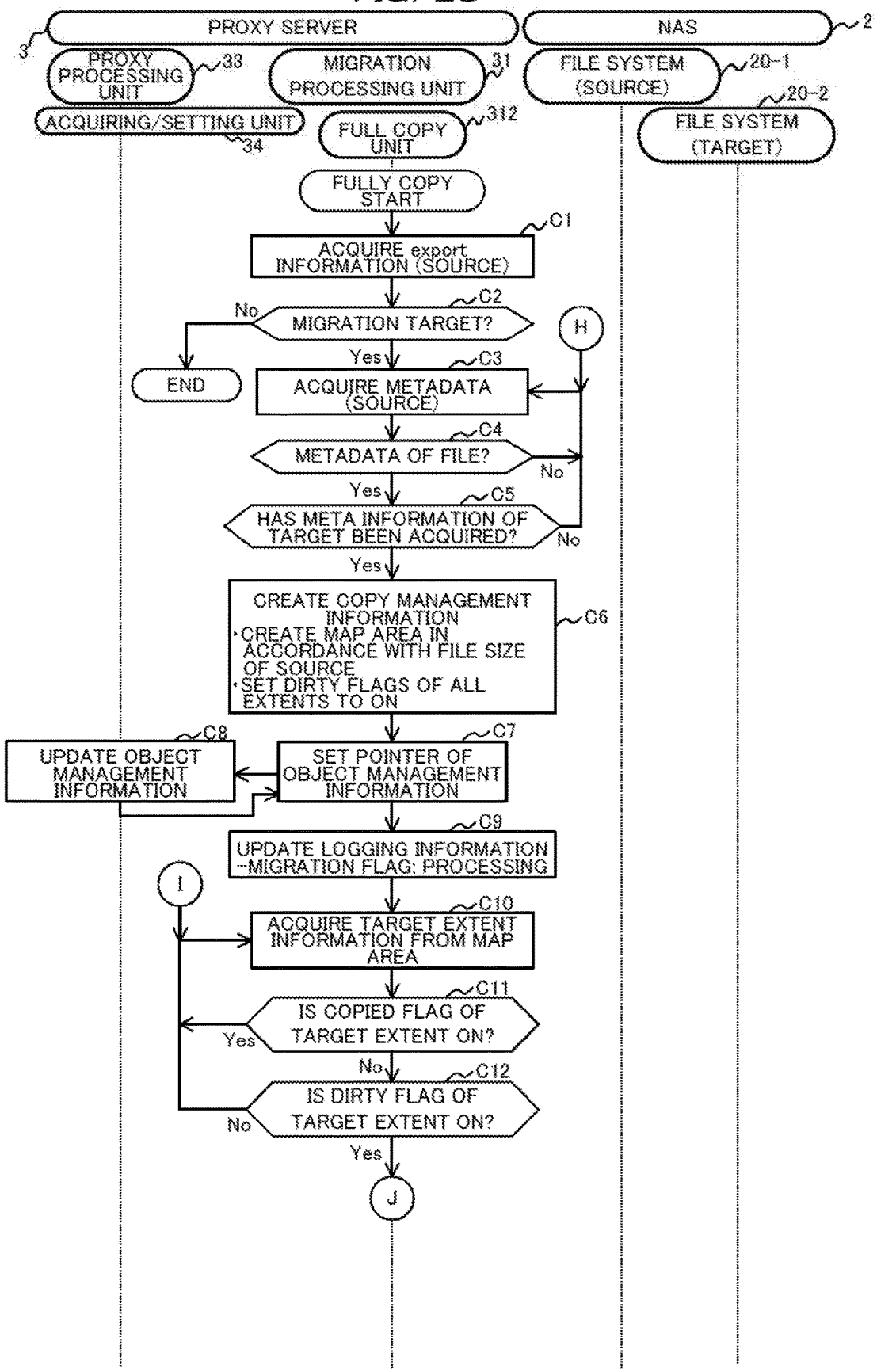
FIG. 28 is a flowchart for describing an exemplary operation of a full copy phase.

As illustrated in FIG. 28, when the initial copy phase ends, the full copy unit 312 acquires the export information from the source 20-1 (process C1) and determines whether or not the source 20-1 is to undergo the migration (process C2).

When the source 20-1 is not to undergo the migration (No in process C2), the process ends. On the other hand, when the source 20-1 is to undergo the migration (Yes in process C2), the full copy unit 312 acquires the metadata in order from the head of the metadata management information 321 of the source 20-1 (process C3).

Then, the full copy unit 312 determines whether or not the acquired metadata is metadata of a file (process C4). When the acquired metadata is not metadata of a file (No in process C4), the process proceeds to C3. On the other hand, when the acquired metadata is metadata of a file (Yes in process C4), the full copy unit 312 determines whether or not the meta information of the target 20-2 has been acquired (process C5). This determination may be performed based on the pointer of "FILE HANDLE (to)" of the object management information 322.

When the meta information of the target 20-2 has not been acquired (No in process C5), the process proceeds to C3. On the other hand, when the meta information of the target 20-2 has been acquired (Yes in process C5), the full copy unit 312 (or the management unit 314) creates the copy management information 323 (process C6). At this time, in the copy management information 323, the map area 324 is created in accordance with the file size of the source 20-1, and the dirty flags of all extents are set to ON. Accordingly, the data movement may be skipped for the extent in which the acquiring/setting unit 34 sets the dirty flag to OFF in accordance with the updated-related NFS request.

The full copy unit 312 requests the migration cooperation unit 331 to set the pointer to the copy management information 323 in the object management information 322 (process C7). The migration cooperation unit 331 cooperates with the management unit 314 to update the object management information 322 (process C8), and the process returns to C7.

Then, the full copy unit 312 updates the target file of the logging information 316 to "migration flag: in process" (process C9), and acquires target extent information from the map area 324 (process C10).

The full copy unit 312 determines whether or not the copied flag of the target extent is ON (process C11), and when the copied flag is OFF (No in process C11), it is determined whether or not the dirty flag of the target extent is ON (process C12).

When the dirty flag is OFF (No in process C12) or when the copied flag is ON in process C11 (Yes in process C11), the process proceeds to C10.

Figure 29:
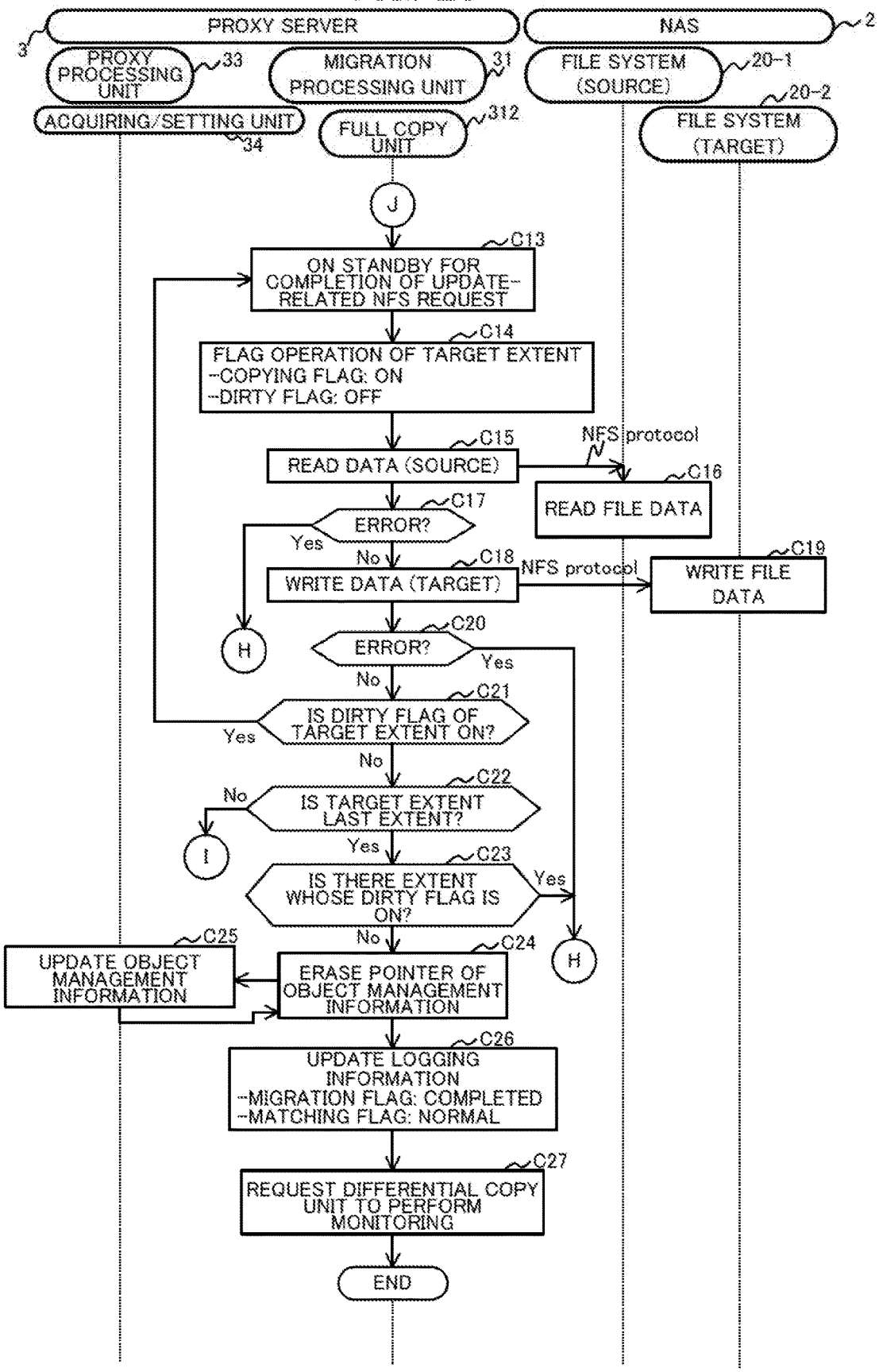
FIG. 29 is a flowchart for describing an exemplary operation of a full copy phase.

When the dirty flag is ON in process C12 (Yes in process C12), the full copy unit 312 is on standby for the completion of the updated-related NFS request (process C13 in FIG. 29). For example, the full copy unit 312 checks the execution state of the updated-related NFS request through the execution counter of the map area 324 and, when an execution counter value is not "0," it may be on standby for the completion of the execution until the execution counter value becomes "0."

Then, the full copy unit 312 sets the copying flag of the target extent to ON, and performs a flag operation of setting the dirty flag to OFF (process C14). The reason why the dirty flag of the extent is set to OFF before the data is read is to detect the occurrence of the updated-related NFS request during reading/writing of data.

Then, the full copy unit 312 instructs the source 20-1 to read the data in accordance with the NFS protocol (process C15), and the source 20-1 reads the file data (process C16). The full copy unit 312 determines a data read error (process C17).

In the error determination, when an error occurs, a retry is performed a predetermined number of times (for example, a maximum of ten times (preliminary)), and when the error is not recovered by the retrying, an error is determined. In this case, the full copy unit 312 may perform management so that "matching flag: abnormal" is recorded in the logging information 316 for the target file, and the retry is performed in the differential copy phase. When an error is determined (Yes in process C17), the process proceeds to C3 in FIG. 28.

On the other hand, when no error is determined (No in process C17), the full copy unit 312 instructs the target 20-2 to write data in accordance with the NFS protocol (process C18), and the target 20-2 writes the file data (process C19). The full copy unit 312 determines a data write error (process C20). Even in the determination of the writing error, the same retry condition as in the determination of the reading error may be used. When an error is determined (Yes in process C20), the process proceeds to C3 in FIG. 28.

When no error is determined (No in process C20), the full copy unit 312 determines whether or not the dirty flag of the target extent is ON (process C21). When the dirty flag is ON (Yes in process C21), the process proceeds to C13. In this case, in order to indicate that the target extent has been updated by the NFS access during the data movement (during reading/writing), the data read process is retried.

When the dirty flag is OFF (No in process C21), the full copy unit 312 determines whether or not the target extent is the last extent (process C22). When the target extent is not the last extent (No in process C22), the process proceeds to C10 in FIG. 28. On the other hand, when the target extent is the last extent (Yes in process C22), the full copy unit 312 determines whether or not there is an extent in which the dirty flag is ON (process C23).

When there is an extent in which the dirty flag is ON (Yes in process C23), the process proceeds to C3 in FIG. 28. On the other hand, when there is no extent in which the dirty flag is ON (No in process C23), the full copy unit 312 requests the migration cooperation unit 331 to delete the pointer to the copy management information 323 from the object management information 322 (process C24). The migration cooperation unit 331 cooperates with the management unit 314 to update the object management information 322 (process C25), and the process returns to C24.

Then, the full copy unit 312 updates the target file of the logging information 316 to "migration flag: completed" and "matching flag: normal" (process C26) and requests the differential copy unit 313 to monitor (process C27), and then the process ends.

[1-8-5] Exemplary Operation of Differential Copy Phase

Next, an exemplary operation of the differential copy phase will be described with reference to FIGS. 30 and 31.

Figure 30:
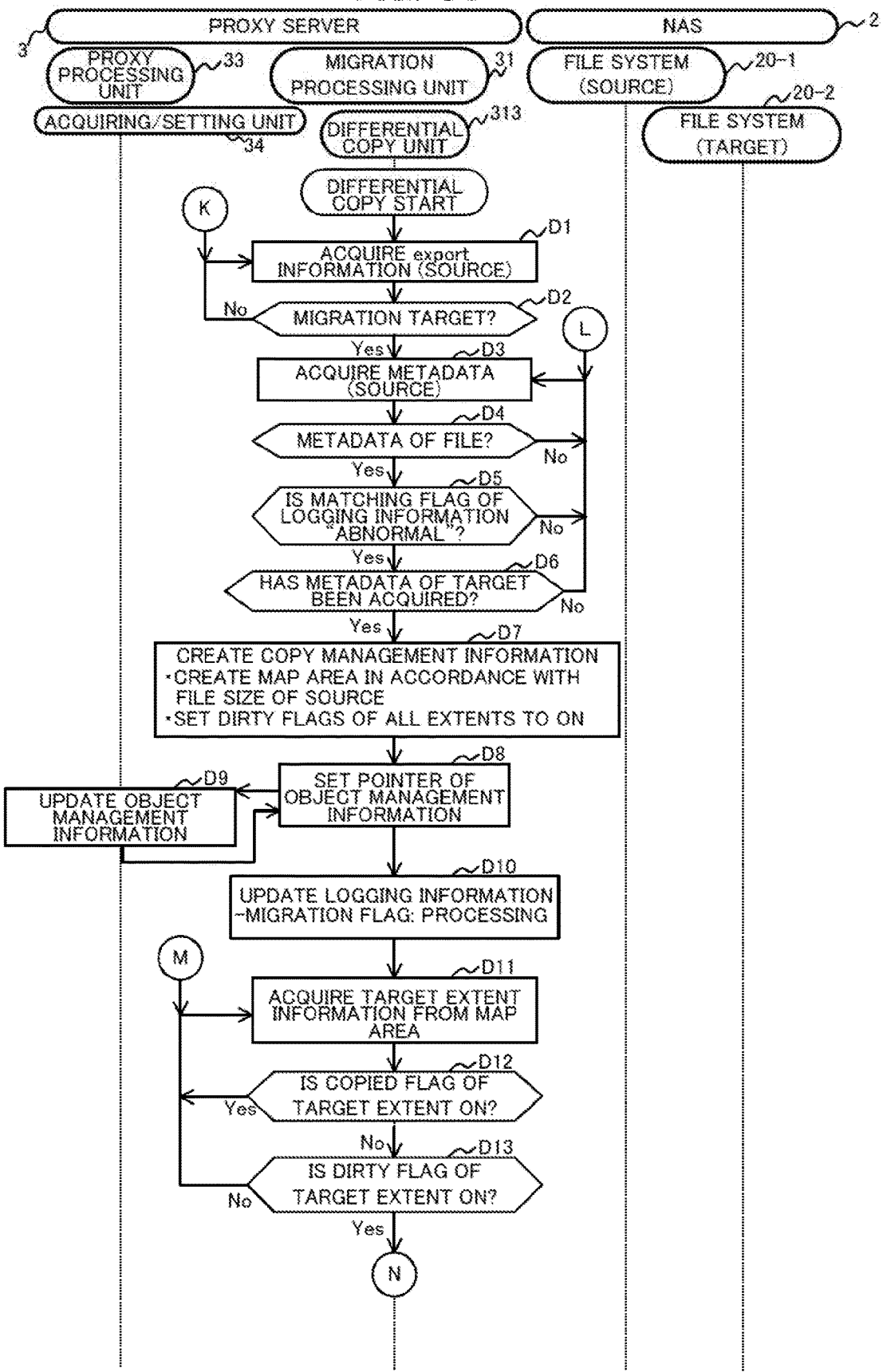
FIG. 30 is a flowchart for describing an exemplary operation of a differential copy phase.

As illustrated in FIG. 30, the differential copy unit 313 acquires the export information from the source 20-1 (process D1) and determines whether or not the source 20-1 is to undergo the migration (process D2).

When the source 20-1 is not to undergo the migration (No in process D2), the process ends. On the other hand, when the source 20-1 is to undergo the migration (Yes in process D2), the differential copy unit 313 acquires the metadata in order from the head of the metadata management information 321 of the source 20-1 (process D3).

Then, the differential copy unit 313 determines whether or not the acquired metadata is metadata of a file (process D4). When the acquired metadata is not metadata of a file (No in process D4), the process proceeds to D3. On the other hand, when the acquired metadata is metadata of a file (Yes in process D4), the differential copy unit 313 determines whether or not the target file of the logging information 316 is "matching flag: abnormal" (process D5).

When the target file of the logging information 316 is not "matching flag: abnormal" (No in process D5), the process proceeds to D3. On the other hand, when the target file of the logging information 316 is "matching flag: abnormal" (Yes in process D5), the differential copy unit 313 determines whether or not the meta information of the target 20-2 has been acquired (process D6). This determination may be performed based on the pointer of "FILE HANDLE (to)" of the object management information 322.

When the meta information of the target 20-2 has not been acquired (No in process D6), the process proceeds to D3. On the other hand, when the meta information of the target 20-2 has been acquired (Yes in process D6), the differential copy unit 313 (or the management unit 314) creates the copy management information 323 (process D7). At this time, in the copy management information 323, the map area 324 is created in accordance with the file size of the source 20-1, and the dirty flags of all extents are set to ON. Accordingly, the data movement may be skipped for the extent in which the acquiring/setting unit 34 sets the dirty flag to OFF in accordance with the updated-related NFS request.

The differential copy unit 313 requests the migration cooperation unit 331 to set the pointer to the copy management information 323 in the object management information 322 (process D8). The migration cooperation unit 331 cooperates with the management unit 314 to update the object management information 322 (process D9), and the process returns to D8.

Then, the differential copy unit 313 updates the target file of the logging information 316 to "migration flag: in process" (process D10), and acquires the target extent information from the map area 324 (process D11).

The differential copy unit 313 determines whether or not the copied flag of the target extent is ON (process D12), and when the copied flag is OFF (No in process D12), it is determined whether or not the dirty flag of the target extent is ON (process D13).

When the dirty flag is OFF (No in process D13) or when the copied flag is ON in process D12 (Yes in process D12), the process proceeds to D11.

Figure 31:
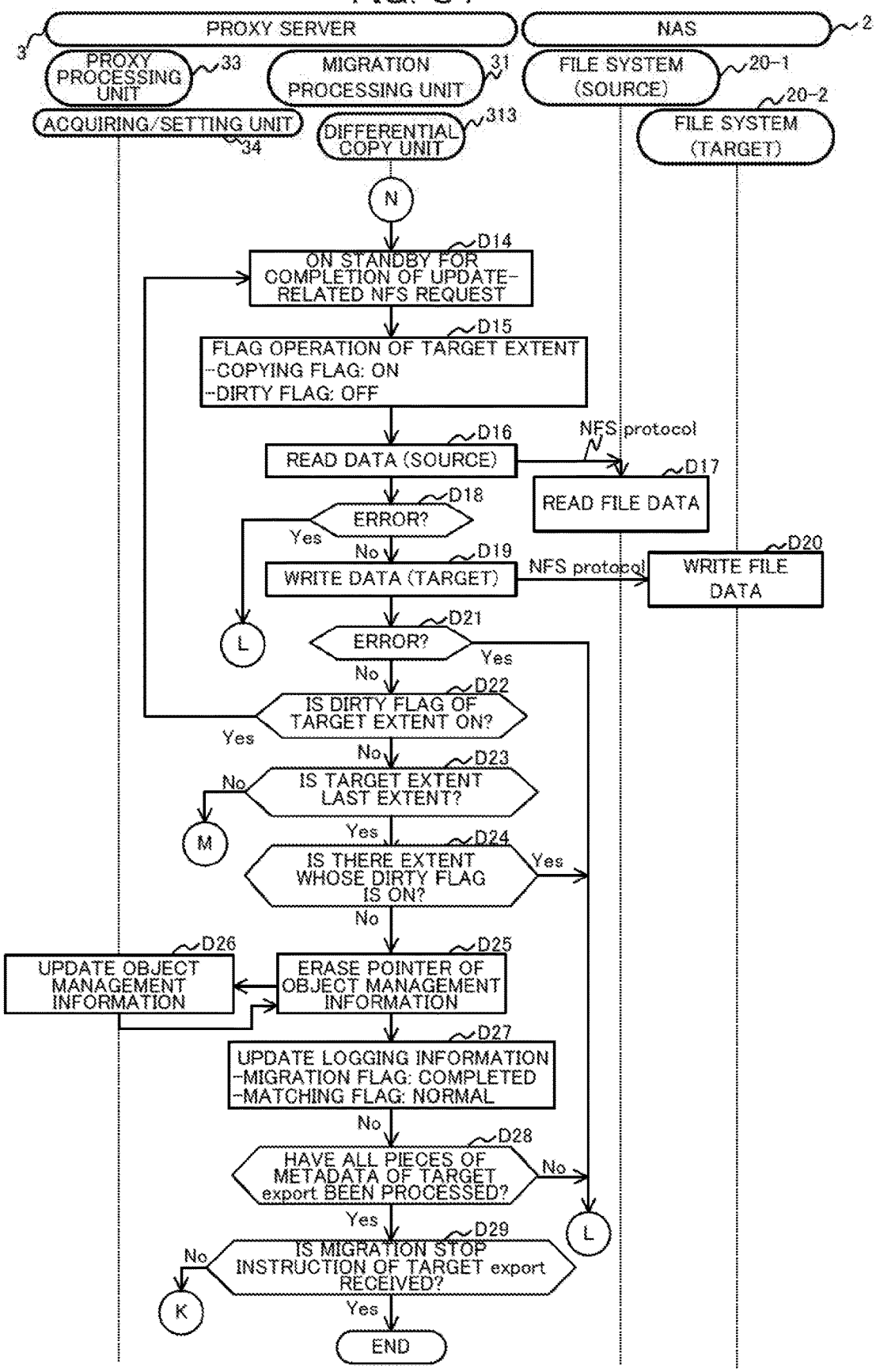
FIG. 31 is a flowchart for describing an exemplary operation of a differential copy phase.

In the process D13, when the dirty flag is ON (Yes in process D13), the differential copy unit 313 is on standby for the completion of the updated-related NFS request (process D14 in FIG. 31). For example, the differential copy unit 313 may check the execution state of the updated-related NFS request through the execution counter of the map area 324, and when the execution counter value is not "0," the differential copy unit 313 may be on standby for the completion of the execution until the execution counter value becomes "0."

Then, the differential copy unit 313 sets the copying flag of the target extent to ON, and performs the flag operation of setting the dirty flag to OFF (process D15). The reason why the dirty flag of the extent is set to OFF before the data is read is to detect the occurrence of the updated-related NFS request during reading/writing of data.

Then, the differential copy unit 313 instructs the source 20-1 to read the data in accordance with the NFS protocol (process D16), and the source 20-1 reads the file data (process D17). The differential copy unit 313 determines the data read error (process D18).

Further, in the error determination, the same retry condition as in the error determination in the full copy phase (process C17) illustrated in FIG. 29 may be used. When an error is determined (Yes in process D18), the process proceeds to D3 in FIG. 30.

On the other hand, when no error is determined (No in process D18), the differential copy unit 313 instructs the target 20-2 to write data in accordance with the NFS protocol (process D19), and the target 20-2 writes the file data (process D20). The differential copy unit 313 determines the data write error (process D21). Even in the determination of the writing error, the same retry condition as in the determination of the reading error may be used. When an error is determined (Yes in process D21), the process proceeds to D3 in FIG. 30.

When no error is determined (No in process D21), the differential copy unit 313 determines whether or not the dirty flag of the target extent is ON (process D22). When the dirty flag is ON (Yes in process D22), the process proceeds to D14. In this case, in order to indicate that the target extent has been updated by the NFS access during the data movement (during reading/writing), the data read process is retried.

When the dirty flag is OFF (No in process D22), the differential copy unit 313 determines whether or not the target extent is the last extent (process D23). When the target extent is not the last extent (No in process D23), the process proceeds to D11 in FIG. 30. On the other hand, When the target extent is the last extent (Yes in process D23), the differential copy unit 313 determines whether or not there is an extent in which the dirty flag is ON (process D24).

When there is an extent in which the dirty flag is ON (Yes in process D24), the process proceeds to D3 in FIG. 30. On the other hand, when there is no extent in which the dirty flag is ON (No in process D24), the differential copy unit 313 requests the migration cooperation unit 331 to delete the pointer to the copy management information 323 from the object management information 322 (process D25). The migration cooperation unit 331 cooperates with the management unit 314 to update the object management information 322 (process D26), and the process returns to D25.

Then, the differential copy unit 313 updates the target file of the logging information 316 to "migration flag: completed" and "matching flag: normal" (process D27) and determines whether or not all pieces of metadata of the target export has been processed (process D28). When there is metadata which has not been processed (No in process D28), the process proceeds to D3 in FIG. 30.

On the other hand, when all pieces of metadata have been processed (Yes in process D28), the differential copy unit 313 determines whether or not the migration stop instruction of the target export has been received (process D29). When the stop instruction has not been received (No in process D29), the process proceeds to D1 in FIG. 30. On the other hand, when the stop instruction has been received (Yes in process D29), the process ends.

[1-9] Exemplary Hardware Configuration

Then, an exemplary hardware configuration of the information processing system 1 according to one embodiment will be described. Further, controllers (not illustrated) of the business server 4, the proxy server 3, and the NAS 2 may have a similar hardware configuration. Thus, hereinafter, a computer 10 will be described below as an example of the hardware configuration.

Figure 32:
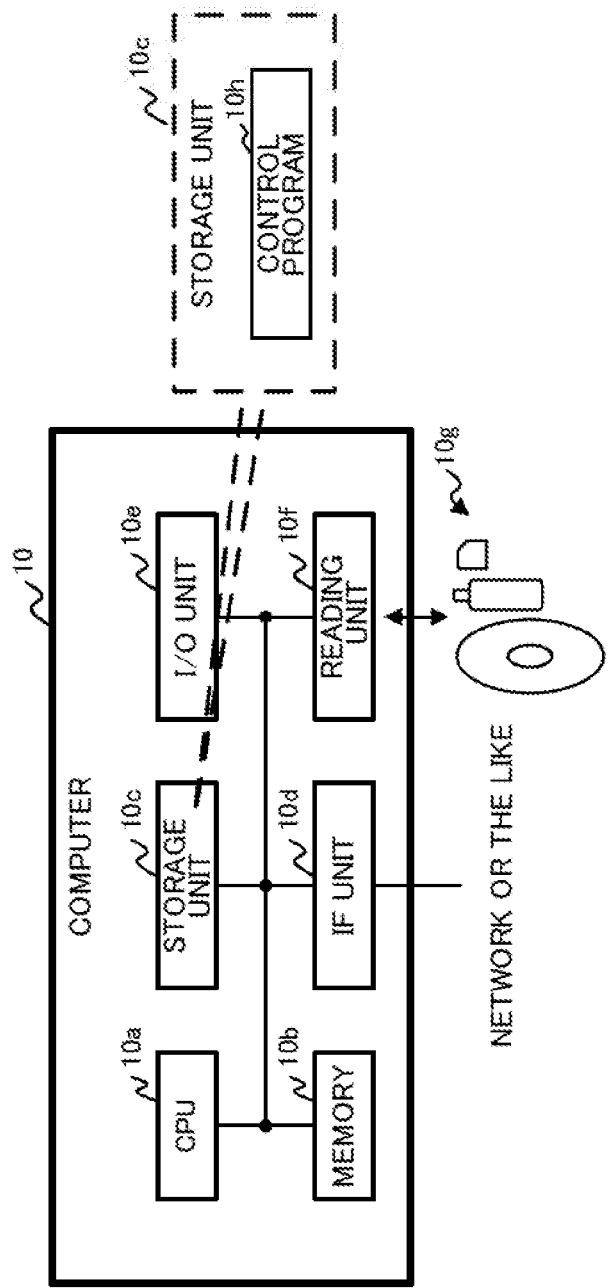
FIG. 32 is a block diagram illustrating an exemplary hardware configuration of an information processing system according to one embodiment.

As illustrated in FIG. 32, the computer 10 includes a central processing unit (CPU) 10a, a memory 10b, a storage unit 10c, an interface (IF) unit 10d, an I/O unit 10e, and a reading unit 10f as an example.

The CPU 10a is an example of a processor that performs various controls and operations. The CPU 10a may be connected to be able to communication with blocks in the computer 10 via a bus. An electronic circuit, for example, an integrated circuit (IC) such as a micro processing unit (MPU), an application specific integrated circuit (ASIC), a field programmable gate array (FPGA), or the like may be used as the processor instead of an operation processing apparatus such as the CPU 10a.

The memory 10b is an example of hardware that stores information such as various data and programs. As the memory 10b, for example, a volatile memory such as a RAM may be used. For example, the information storage unit 32 of the proxy server 3 may be implemented by the memory 10b.

The storage unit 10c is an example of hardware that storing information such as various data and programs. Examples of the storage unit 10c include various storage apparatuses such as a magnetic disk apparatus such as an HDD, a semiconductor drive apparatus such as an SSD, and a non-volatile memory such as a flash memory or a read only memory (ROM).

For example, the storage unit 10c may store a control program 10h that implements all or some of various kinds of functions of the computer 10. The control program 10h may include a program of implementing the function of the controller of the business server 4, the proxy server 3, or the NAS 2 according to one embodiment.

The CPU 10a is able to implement the function of the computer 10, for example, by developing the control program 10h stored in the storage unit 10c onto the memory 10b and executing the control program 10h. When at least some of the functions of the computer 10 (for example, the proxy server 3) are implemented by a cloud environment or the like, the control program 10h may be provided to both the computer 10 and the cloud environment. Alternatively, the control program 10h may be appropriately divided and provided to each of the computer 10 and the cloud environment.

The IF unit 10d is an example of a communication interface of performing a connection with a network, communication control, and the like among of the controllers of the business server 4, the proxy server 3, and the NAS 2. For example, the IF unit 10d may be an adapter conforming to an LAN, an SCSI or the like.

The control program 10h may be downloaded from the network or the like to the computer 10 via the IF unit 10d.

The I/O unit 10e may include at least some of an input unit such as a mouse, a keyboard, or an operation button and an output unit such as a display or a printer.

The reading unit 10f is an example of a reader that reads information of data and programs recorded in a recording medium 10g. The reading unit 10f may include a connecting terminal or apparatus to which a non-transitory computer-readable recording medium 10g is connectable or insertable. Examples of the reading unit 10f include an adapter conforming to a universal serial bus (USB) or the like, a drive apparatus that accesses a recording disk, a card reader that accesses a flash memory such as an SD card, and the like. The control program 10h may be stored in the recording medium 10g.

An example of the recording media 10g include a non-transitory recording media such as a magnetic/optical disk or a flash memory. Examples of the magnetic/optical disks include a flexible disk, a compact disc (CD), a digital versatile disc (DVD), a Blu-ray disc, a holographic versatile disc (HVD), and the like. Example of the flash memory include a USB memory and an SD card. Examples of the CD include a CD-ROM, a CD-R, a CD-RW, and the like. Examples of the DVD include a DVD-ROM, a DVD-RAM, a DVD-R, a DVD-RW, a DVD+R, a DVD+RW, and the like.

The hardware configuration of the computer 10 described above is an example. Therefore, an increase or a decrease (for example, addition or deletion of an arbitrary block), division, or an integration by an arbitrary combination of hardware in the computer 10 or addition or deletion of a bus may be appropriately performed. Further, the hardware configurations of the controllers of the proxy server 3 and the NAS 2 may be integrated into one computer 10.

[2] Others

It is possible to modify or change the technology according to the above-described one embodiment as follows. For example, in the proxy server 3, the functions of the migration processing unit 31, the information storage unit 32, and the proxy processing unit 33 may be merged in arbitrary combinations or divided.

In one aspect, it is possible to improve availability or reliability of the network storage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system, comprising:
one or more network storages; and
a relay apparatus that relays communication between a host apparatus and the one or more network storages,
the relay apparatus includes
a memory; and
a processor connected to the memory,
the processor is configured to perform a first migration process of migrating a migration source file system to a migration target file system among file systems included in the one or more network storages,
the memory is configured to store object management information and migration management information,
the object management information managing a target object of the first migration process stored in the migration source file system and the target object to be stored in the migration target file system, and the migration management information managing a progress status of the first migration process for each object,
the processor is configured to:
when a write request for the target object is received from the host apparatus, select, in a case where the write request is intended for a data area of the target object that has not been migrated or has been migrated with reference to the migration management information, both the migration source file system and the migration target file system from the object management information;
perform a process related to the write request on the file systems selected, and
migrate the target object in units of data areas having a predetermined size,
in the migration management information, the progress status of the first migration process related to the target object is managed in units of the data areas having the predetermined size.

2. The information processing system according to claim 1,
wherein, when the write request is intended for the data area that has not been migrated or has been migrated, the processor sets information indicating migration completion for the data area intended by the write request in the migration management information, and
in the first migration process, the processor does not perform migration of the data area intended by the write request with reference to the migration management information.

3. The information processing system according to claim 1, wherein the processor selects the migration source file system based on the object management information when the write request is intended for a data area which is being migrated.

4. The information processing system according to claim 1, wherein,
when a data mismatch occurs in a data area between the migration source file system and the migration target file system due to execution of the process related to the write request, the processor sets information indicating the occurrence of the data mismatch in the data area in the migration management information, and
in the first migration process, the processor performs migration of the data area in which the data mismatch has occurred based on the migration management information.

5. The information processing system according to claim 1, wherein, when the first migration process is completed, the processor performs a second migration process of maintaining an equivalent state between the migration source file system and the migration target file system.

6. The information processing system according to claim 5,
wherein the relay apparatus includes a log manager configured to manage information indicating an object in which a data mismatch has occurred between the migration source file system and the migration target file system, and
in the second migration process, the processor performs migration of the object in which the data mismatch has occurred between the migration source file system and the migration target file system with reference to the log manager.

7. The information processing system according to claim 1, wherein the processor performs an initial migration process of migrating attribute information of an object stored in the migration source file system to the migration target file system before execution of the first migration process.

8. An information processing apparatus, comprising:
a memory; and
a processor connected to the memory,
the processor is configured to perform a first migration process of migrating a migration source file system to a migration target file system among file systems included in one or more network storages,
the memory is configured to store object management information and migration management information,
the object management information managing a target object of the first migration process stored in the migration source file system and the target object to be stored in the migration target file system, and the migration management information managing a progress status of the first migration process for each object,
the processor is configured to:
when a write request for the target object is received from a host apparatus, select, in a case where the write request is intended for a data area of the target object that has not been migrated or has been migrated with reference to the migration management information, both the migration source file system and the migration target file system from the object management information;
perform a process related to the write request on the file systems selected, and
migrate the target object in units of data areas having a predetermined size,
in the migration management information, the progress status of the first migration process related to the target object is managed in units of the data areas having the predetermined size.

9. The information processing apparatus according to claim 8,
wherein, when the write request is intended for the data area that has not been migrated or has been migrated, the processor sets information indicating migration completion for the data area intended by the write request in the migration management information, and
in the first migration process, the processor does not perform migration of the data area intended by the write request with reference to the migration management information.

10. The information processing apparatus according to claim 8, wherein the processor selects the migration source file system based on the object management information when the write request is intended for a data area which is being migrated.

11. The information processing apparatus according to claim 8,
wherein, when a data mismatch occurs in a data area between the migration source file system and the migration target file system due to execution of the process related to the write request, the processor sets information indicating the occurrence of the data mismatch in the data area in the migration management information, and
in the first migration process, the processor performs migration of the data area in which the data mismatch has occurred based on the migration management information.

12. The information processing apparatus according to claim 8, wherein, when the first migration process is completed, the processor performs a second migration process of maintaining an equivalent state between the migration source file system and the migration target file system.

13. The information processing apparatus according to claim 12, further comprising,
a log manager configured to manage information indicating an object in which a data mismatch has occurred between the migration source file system and the migration target file system,
wherein, in the second migration process, the processor performs migration of the object in which the data mismatch has occurred between the migration source file system and the migration target file system with reference to the log manager.

14. The information processing apparatus according to claim 8, wherein the processor performs an initial migration process of migrating attribute information of an object stored in the migration source file system to the migration target file system before execution of the first migration process.

15. A non-transitory computer-readable recording medium having stored therein a control program for causing a computer to execute a process comprising:
performing a first migration process of migrating a migration source file system to a migration target file system among file systems included in the one or more network storages;
referring to object management information and migration management information, the object management information managing a target object of the first migration process stored in the migration source file system and the target object to be stored in the migration target file system, and the migration management information managing a progress status of the first migration process for each object, the object management information and the migration management information being stored in a memory, when a write request for the target object is received from a host apparatus;
when a write request for the target object is received from the host apparatus, selecting, in a case where the write request is intended for a data area of the target object that has not been migrated or has been migrated with reference to the migration management information, both the migration source file system and the migration target file system from the object management information; and
performing a process related to the write request on the file systems selected,
the migration management information manages a progress status of the first migration process related to the target object in units of data areas having a predetermined size,
the first migration process migrates the target object in units of the data areas having the predetermined size.

16. The non-transitory computer-readable recording medium according to claim 15,
wherein, when the write request is intended for the data area that has not been migrated or has been migrated, the selecting includes setting information indicating migration completion for the data area intended by the write request in the migration management information, and
the first migration process does not perform migration of the data area intended by the write request with reference to the migration management information.

17. The non-transitory computer-readable recording medium according to claim 15, wherein the selecting includes selecting the migration source file system based on the object management information when the write request is intended for a data area which is being migrated.

* * * * *